(12) United States Patent
Boutin et al.

(10) Patent No.: US 11,358,451 B2
(45) Date of Patent: Jun. 14, 2022

(54) CRANK ASSEMBLY FOR A TARPAULIN RETRACTION AND EXTENSION DEVICE

(71) Applicant: FABRICATION ELCARGO INC., Saint-Hyacinthe (CA)

(72) Inventors: Keven Boutin, Drummondville (CA); Etienne Brunet, St-Hyacinthe (CA); Kendrick Martin, Laprairie (CA)

(73) Assignee: FABRICATION ELCARGO INC., Saint-Hyacinthe (CA)

( * ) Notice: Subject to any disclaimer, the term of this patent is extended or adjusted under 35 U.S.C. 154(b) by 55 days.

(21) Appl. No.: 17/123,455

(22) Filed: Dec. 16, 2020

(65) Prior Publication Data

US 2021/0188062 A1 Jun. 24, 2021

Related U.S. Application Data

(60) Provisional application No. 62/950,606, filed on Dec. 19, 2019.

(51) Int. Cl.
| | |
|---|---|
| *B60J 7/08* | (2006.01) |
| *B60J 11/02* | (2006.01) |
| *B65D 88/12* | (2006.01) |
| *B60P 7/04* | (2006.01) |

(52) U.S. Cl.
CPC .............. *B60J 7/085* (2013.01); *B60J 11/02* (2013.01); *B60P 7/04* (2013.01); *B65D 88/125* (2013.01)

(58) Field of Classification Search
CPC .. B60J 7/065; B60J 7/085; B60J 11/02; B60P 7/04; B65D 88/125

USPC ........ 296/98, 100.1, 100.15, 100.16, 100.18; 410/97, 100

See application file for complete search history.

(56) References Cited

U.S. PATENT DOCUMENTS

| | | |
|---|---|---|
| 473,292 A | 4/1892 | Campbell et al. |
| 1,318,820 A | 10/1919 | Watkins |
| 1,784,248 A | 12/1930 | Truly et al. |
| 1,786,048 A | 12/1930 | Williams |
| 2,562,300 A | 7/1951 | Dingman |
| 2,976,082 A | 3/1961 | Dahlman |
| 2,997,967 A | 8/1961 | Malapert |
| 3,366,414 A | 1/1968 | Gile et al. |
| 3,384,413 A | 5/1968 | Sargent |
| 3,423,126 A | 1/1969 | Galvin et al. |
| 3,768,540 A | 10/1973 | McSwain |
| 3,785,694 A | 1/1974 | Sargent |
| 3,819,082 A | 6/1974 | Rosenvold |
| 3,829,154 A | 8/1974 | Becknell |
| 3,889,321 A | 6/1975 | Moser |
| 4,027,360 A | 6/1977 | Moser |

(Continued)

FOREIGN PATENT DOCUMENTS

CA 1212974 9/1982

*Primary Examiner* — Joseph D. Pape
*Assistant Examiner* — Veronica M Shull

(57) ABSTRACT

A crank assembly for operating a tarpaulin manipulator used for extending and retracting a tarpaulin respectively across and from a top aperture of a vehicle container. The crank assembly includes a crank and a crank assembly shaft for transmitting rotations of the crank to the tarpaulin manipulator through a transmission assembly. The crank can be moved between a mounted configuration in which the crank protrudes axially from the crank assembly shaft and a stowed configuration in which the crank is folded over the crank assembly shaft.

25 Claims, 14 Drawing Sheets

(56) References Cited

U.S. PATENT DOCUMENTS

| | | | |
|---|---|---|---|
| 4,030,780 A * | 6/1977 | Petretti | B60J 7/085 160/67 |
| 4,212,492 A | 7/1980 | Johnsen | |
| 4,225,175 A | 9/1980 | Fredin | |
| 4,234,224 A | 11/1980 | Rosenvold | |
| 4,279,064 A | 7/1981 | Simme | |
| 4,302,043 A | 11/1981 | Dimmer et al. | |
| 4,369,009 A | 1/1983 | Fulford | |
| 4,380,350 A | 4/1983 | Block | |
| RE31,746 E | 11/1984 | Dimmer et al. | |
| 4,484,732 A | 11/1984 | Gould | |
| 4,484,777 A | 11/1984 | Michel | |
| 4,505,512 A | 3/1985 | Schmeichel et al. | |
| 4,518,193 A | 5/1985 | Heider et al. | |
| 4,529,098 A | 7/1985 | Heider et al. | |
| 4,657,062 A | 4/1987 | Tuerk | |
| 4,659,134 A | 4/1987 | Johnson | |
| 4,673,208 A | 6/1987 | Tsukamoto | |
| 4,691,957 A | 9/1987 | Ellingson | |
| 4,700,985 A | 10/1987 | Whitehead | |
| 4,834,445 A | 5/1989 | Odegaard | |
| 4,858,984 A | 8/1989 | Weaver | |
| 4,909,563 A | 3/1990 | Walker | |
| 4,915,439 A | 4/1990 | Cramaro | |
| 4,987,942 A | 1/1991 | Eriksson | |
| 4,991,901 A | 2/1991 | Meekhof, Sr. et al. | |
| 5,002,328 A | 3/1991 | Michel | |
| 5,026,109 A | 6/1991 | Merlot, Jr. | |
| 5,050,923 A | 9/1991 | Petelka | |
| 5,086,908 A | 2/1992 | Gladish et al. | |
| 5,174,625 A | 12/1992 | Gothier et al. | |
| 5,179,991 A | 1/1993 | Haddad, Jr. | |
| 5,180,203 A | 1/1993 | Goudy | |
| 5,186,231 A | 2/1993 | Lewis | |
| 5,211,440 A | 5/1993 | Cramaro | |
| 5,240,303 A | 8/1993 | Hageman | |
| 5,253,914 A | 10/1993 | Biancale | |
| 5,328,228 A | 7/1994 | Klassen | |
| 5,429,403 A | 7/1995 | Brasher | |
| 5,466,030 A | 11/1995 | Harris et al. | |
| 5,540,475 A | 7/1996 | Kersting et al. | |
| 5,542,734 A | 8/1996 | Burchett et al. | |
| 5,549,347 A | 8/1996 | Anderson | |
| 5,658,037 A | 8/1997 | Evans et al. | |
| 5,690,377 A | 11/1997 | Denyer | |
| 5,692,793 A | 12/1997 | Wilson | |
| 5,697,663 A | 12/1997 | Chenowth | |
| 5,713,712 A | 2/1998 | McIntyre | |
| 5,762,002 A | 6/1998 | Dahlin et al. | |
| 5,765,901 A | 6/1998 | Wilkens | |
| 5,794,528 A | 8/1998 | Gronig et al. | |
| 5,823,067 A | 10/1998 | Clarys et al. | |
| 5,911,467 A | 6/1999 | Evans et al. | |
| 5,924,758 A | 7/1999 | Dimmer et al. | |
| 5,938,270 A | 8/1999 | Swanson et al. | |
| 5,984,379 A | 11/1999 | Michel et al. | |
| 6,007,138 A | 12/1999 | Cramaro | |
| 6,135,534 A | 10/2000 | Schmeichel | |
| 6,142,553 A | 11/2000 | Bodecker | |
| 6,142,554 A | 11/2000 | Carroll et al. | |
| 6,152,516 A | 11/2000 | Williams | |
| 6,193,299 B1 | 2/2001 | Than | |
| 6,199,935 B1 | 3/2001 | Waltz et al. | |
| 6,206,449 B1 | 3/2001 | Searfoss | |
| 6,234,562 B1 | 5/2001 | Henning | |
| 6,318,790 B1 | 11/2001 | Henning | |
| 6,322,041 B1 | 11/2001 | Schmeichel | |
| 6,361,100 B1 | 3/2002 | Koester | |
| 6,435,595 B1 | 8/2002 | Chenowth | |
| 6,435,599 B2 | 8/2002 | Than | |
| 6,478,361 B1 | 11/2002 | Wood | |
| 6,513,856 B1 | 2/2003 | Swanson et al. | |
| 6,527,331 B2 | 3/2003 | Searfoss | |
| 6,595,594 B2 | 7/2003 | Royer | |
| 6,655,726 B2 | 12/2003 | Bergeron | |
| 6,715,817 B2 | 4/2004 | Nolan et al. | |
| 6,779,828 B1 | 8/2004 | Poyntz | |
| 6,783,168 B2 | 8/2004 | Searfoss | |
| 6,805,395 B2 | 10/2004 | Royer | |
| 6,886,879 B2 | 5/2005 | Nolan et al. | |
| 6,905,161 B2 | 6/2005 | Fliege et al. | |
| 6,926,337 B2 | 9/2005 | Poyntz | |
| 7,189,042 B1 | 3/2007 | Schmit | |
| 7,506,912 B2 | 3/2009 | Royer | |
| 7,513,561 B2 | 4/2009 | Royer | |
| 7,549,695 B2 | 6/2009 | Royer | |
| 8,177,284 B1 | 5/2012 | Royer | |
| 8,641,123 B1 | 2/2014 | Royer | |
| 8,998,287 B2 | 4/2015 | Smith et al. | |
| 9,272,610 B2 | 3/2016 | Schmeichel et al. | |
| 2002/0021018 A1 | 2/2002 | Royer | |
| 2002/0043816 A1 | 4/2002 | Johnston | |
| 2002/0109371 A1 | 8/2002 | Wheatley | |
| 2002/0135199 A1 | 9/2002 | Hanning | |
| 2003/0052506 A1 * | 3/2003 | Royer | B60J 7/085 296/98 |
| 2003/0090124 A1 | 5/2003 | Nolan | |
| 2003/0190209 A1 | 8/2003 | Smith | |
| 2004/0195858 A1 | 10/2004 | Martin | |
| 2008/0217952 A1 | 9/2008 | Royer | |
| 2010/0230994 A1 | 9/2010 | Royer | |
| 2010/0320798 A1 | 12/2010 | Huotari et al. | |
| 2011/0254310 A1 | 10/2011 | Royer | |
| 2014/0354006 A1 * | 12/2014 | Schmeichel | B60J 7/085 296/98 |
| 2015/0165883 A1 * | 6/2015 | Smith | B60J 7/085 220/262 |
| 2016/0332557 A1 | 11/2016 | Royer | |
| 2019/0270365 A1 | 9/2019 | Royer | |
| 2020/0298689 A1 | 9/2020 | Royer | |

* cited by examiner

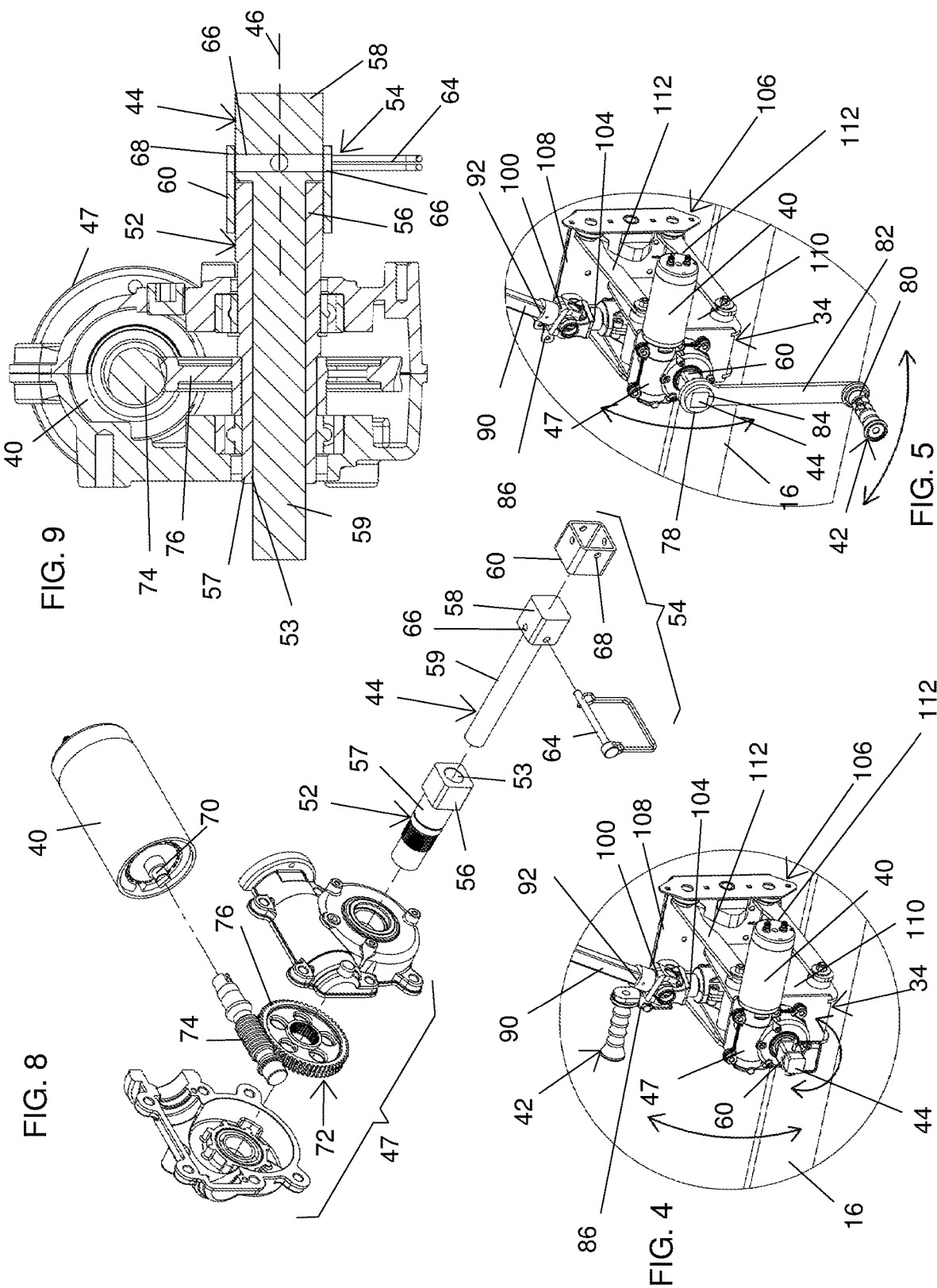

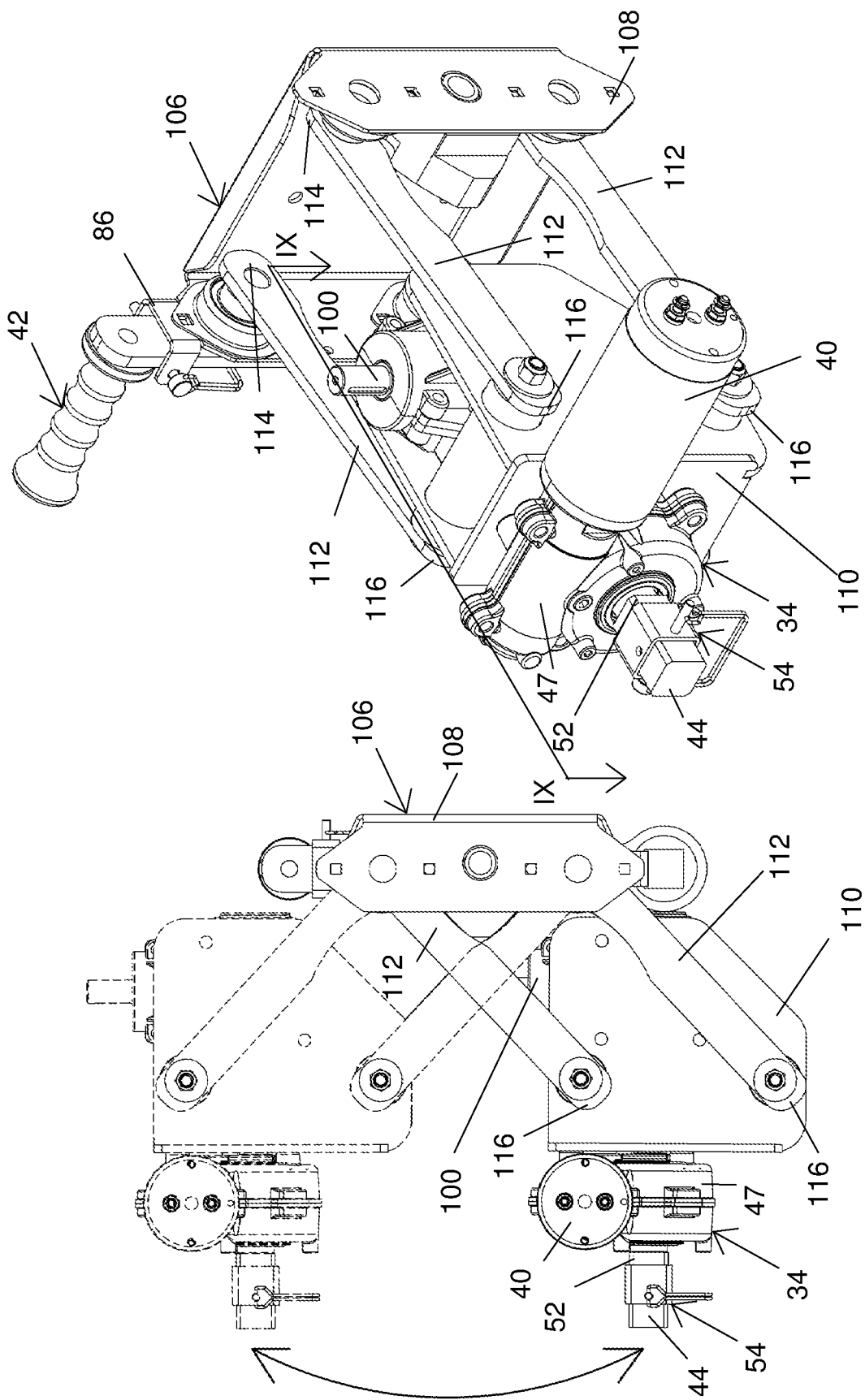

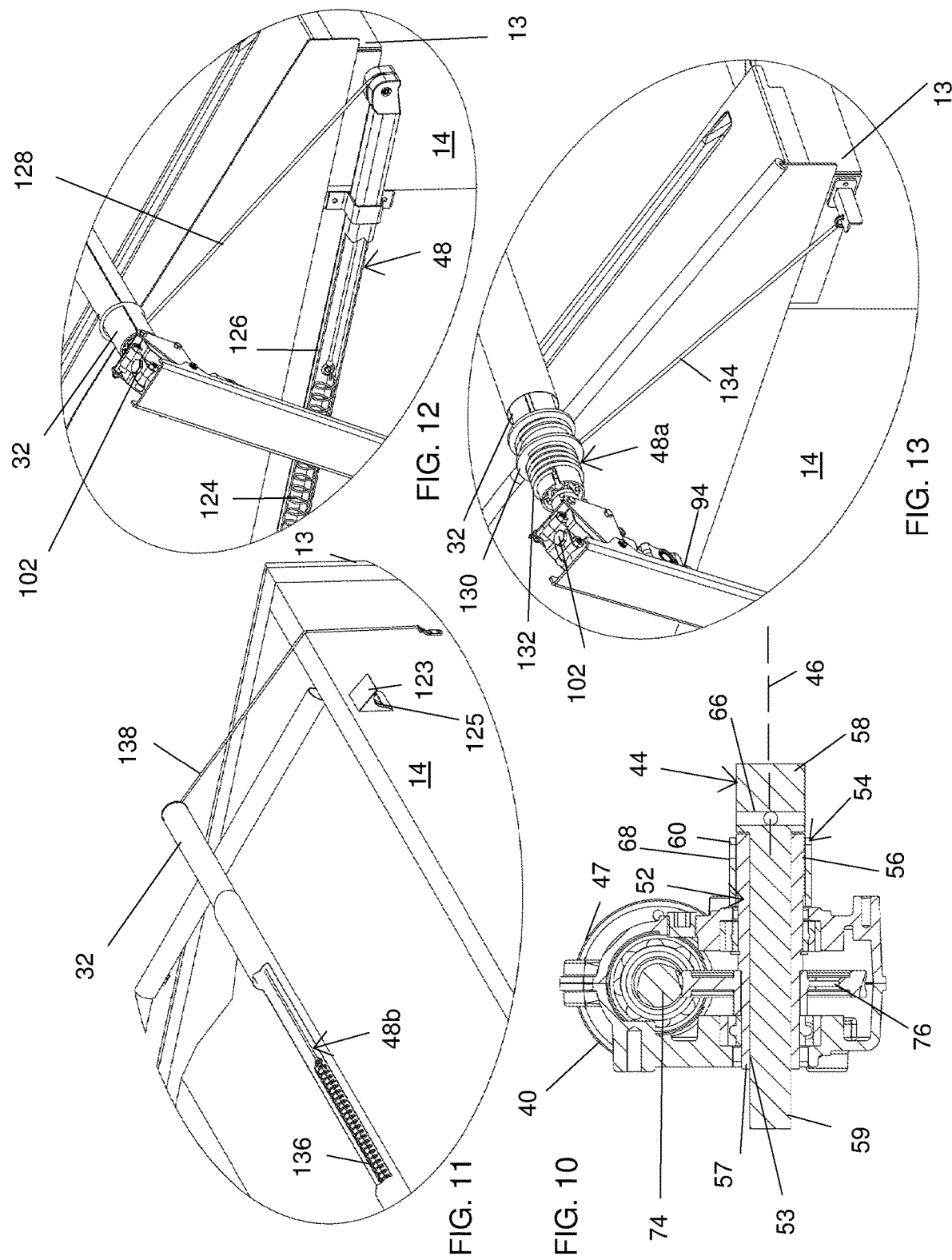

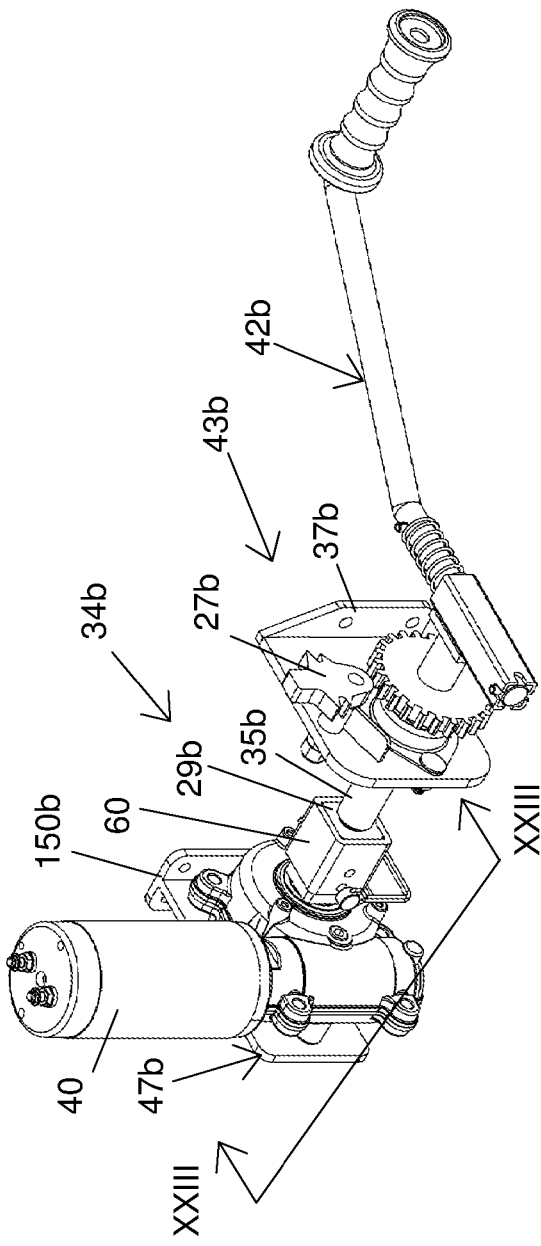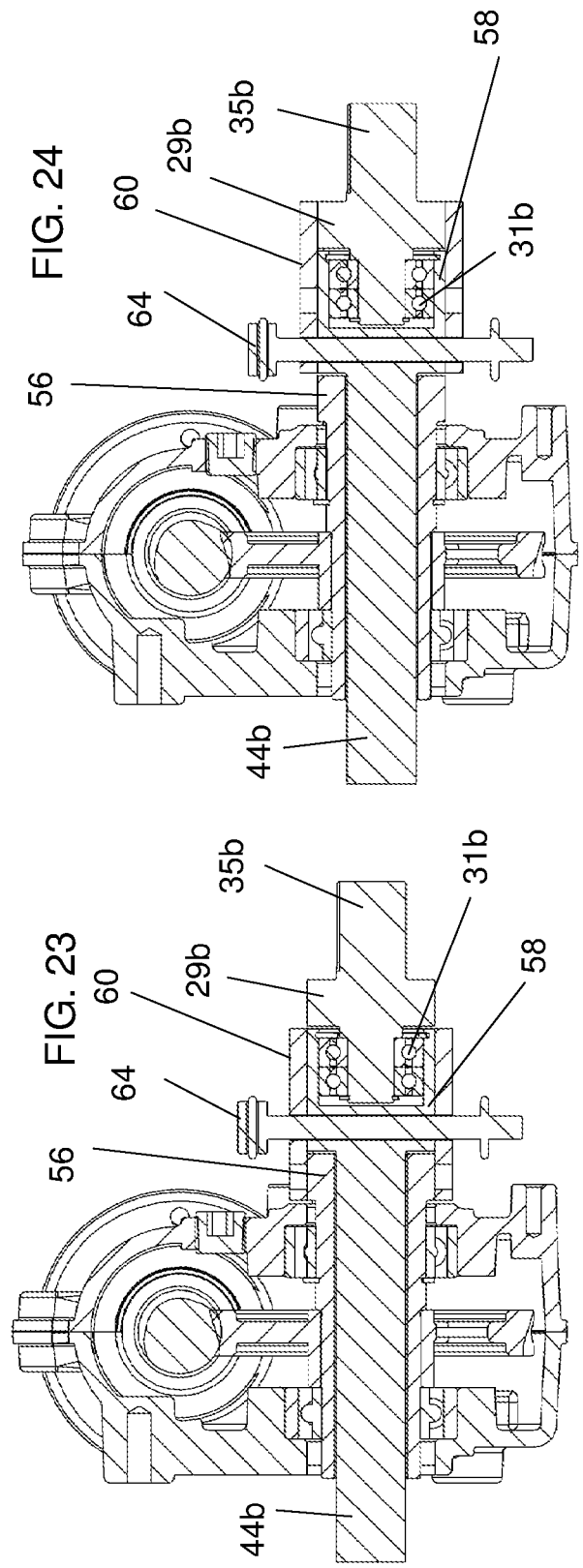

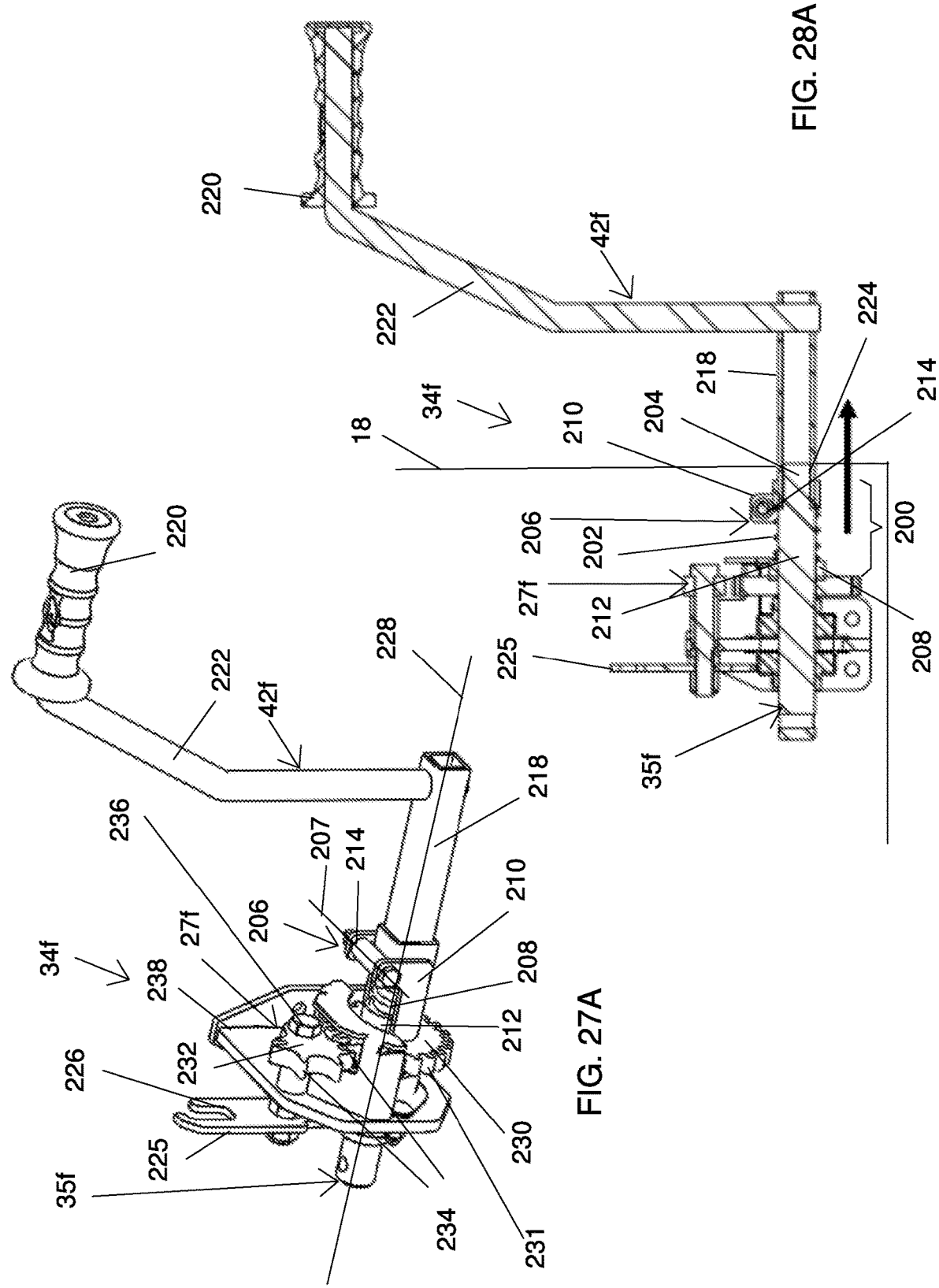

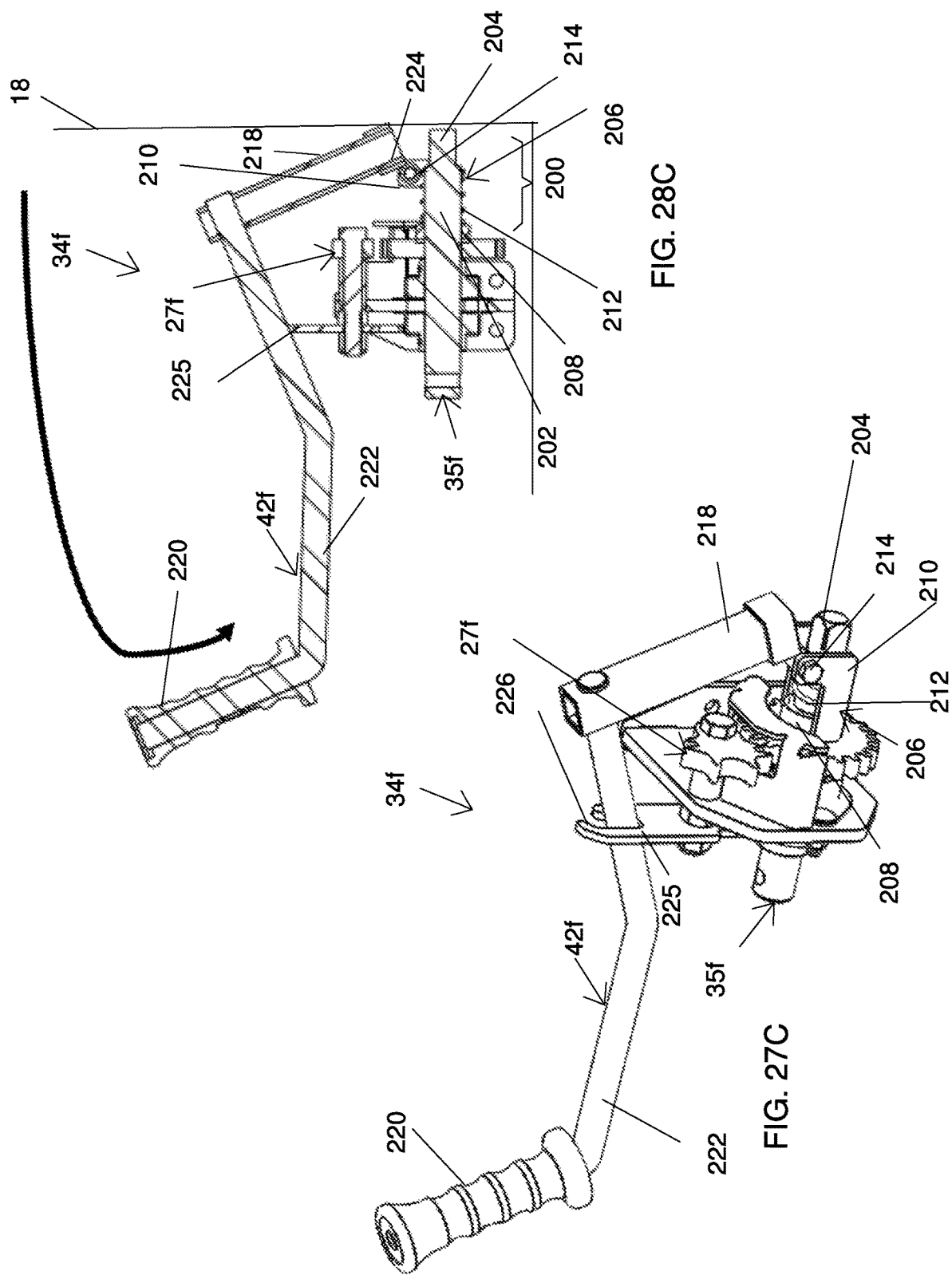

CRANK ASSEMBLY FOR A TARPAULIN RETRACTION AND EXTENSION DEVICE

FIELD OF THE INVENTION

The present invention relates generally to the field of transportation, and, more particularly, to a crank assembly for operating tarpaulin retraction and extension device usable for example with open top vehicle mounted containers.

BACKGROUND

There are many systems for covering top apertures of truck-movable containers, such as open top truck trailers and the bin of dump trucks. Many such systems are operated using a crank. In many such systems, operating the crank requires that the crank protrudes from the container. If left protruding, the crank could be accidentally damaged when the container is moved.

Against this background, there exists a need for an improved crank assembly for a tarpaulin retraction and extension device. An object of the present invention is to provide such crank assembly.

SUMMARY OF THE INVENTION

In a broad aspect there is provided a device for handling a tarpaulin to cover at least part of a container using the tarpaulin, the container defining a container bottom wall, a container peripheral wall extending therefrom and a container top aperture delimited by a container top edge of the container peripheral wall substantially opposed to the container bottom wall, the container top aperture defining an aperture first end and a substantially opposed aperture second end, the tarpaulin defining a tarpaulin first end and a substantially opposed tarpaulin second end, the tarpaulin being secured to the container at the tarpaulin first end substantially opposed to the aperture second end and movable between tarpaulin retracted and extended configurations in which the tarpaulin is respectively substantially retracted from the container top aperture and extended across the container top aperture, the device comprising: a tarpaulin manipulator for engaging the tarpaulin to be operable between a retracting mode and an extending mode, wherein, in the retracting mode, the tarpaulin manipulator is operable for moving the tarpaulin second end towards the aperture first end while withdrawing the tarpaulin from the container top aperture to move the tarpaulin to the tarpaulin retracted configuration, and, in the extending mode, the tarpaulin manipulator is operable for moving the tarpaulin second end towards the aperture second end while extending the tarpaulin across the container top aperture to move the tarpaulin to the tarpaulin extended configuration; an actuator assembly, the actuator assembly including a crank and a crank assembly shaft defining a substantially longitudinal crank shaft rotation axis, the crank assembly shaft defining a crank assembly shaft distal end, the crank including a crank coupling portion, the crank being movable relative to the crank assembly shaft between crank mounted and stowed configurations with the crank and crank assembly shaft remaining mechanically coupled to each other; and a transmission assembly between the crank assembly shaft and the tarpaulin manipulator, the transmission assembly being operatively coupled to the crank assembly shaft and to the tarpaulin manipulator for transmitting rotations of the crank assembly shaft to the tarpaulin manipulator so that rotation of the crank assembly shaft about the crank shaft rotation axis causes the tarpaulin manipulator to operate in either the extending or the retracting modes; wherein, in the crank mounted configuration, the crank coupling portion and the crank assembly shaft are engaged to each other at the crank assembly shaft distal end so that the crank and crank assembly shaft are jointly rotatable about the crank shaft rotation axis with the crank protruding longitudinally from the crank assembly shaft, and, in the crank stowed configuration, the crank coupling portion is disengaged from the crank distal end and the crank is pivoted to be radially in register with the crank assembly shaft; and wherein, with the crank in the crank mounted configuration, rotating the crank in a first direction about the crank shaft rotation axis operates the tarpaulin manipulator in the retracting mode and rotating the crank in a second direction opposite the first direction about the crank shaft rotation axis operates the tarpaulin manipulator in the extending mode.

There may also be provided a device wherein the crank coupling portion defines a mounting recess configured to removably longitudinally receive the crank assembly shaft at the crank assembly shaft distal end.

There may also be provided a device wherein the crank and the mounting recess have each have a transversal cross-sectional configuration lacking continuous rotational symmetry.

There may also be provided a device wherein the crank and the mounting recess have each have a polygonal transversal cross-sectional configuration.

There may also be provided a device further comprising a crank mount, the crank mount being movable longitudinally along the crank assembly shaft between crank mount proximal and distal positions, the crank being pivotally mounted to the crank mount so as to be pivotable about a pivot axis perpendicular and laterally offset relative to the crank shaft rotation axis between crank extended and retracted positions wherein: in the crank mounted configuration, the crank mount is in the crank mount proximal position, the crank is in the crank extended position, and mechanical interference between the crank coupling portion and the crank assembly shaft prevents pivotal movements of the crank towards the crank retracted position; in the crank stowed configuration, the crank mount is in the crank mount proximal position and the crank is pivoted in the crank retracted position; and the crank is movable to a crank transition configuration in which the crank mount is in the crank mount distal position, and the crank is freely pivotable between the crank extended and retracted positions.

There may also be provided a device further comprising a biasing element biasing the crank mount towards the crank mount proximal position.

There may also be provided a device wherein the crank mount includes a collar mounted to the crank assembly shaft so as to be longitudinally movable therealong.

There may also be provided a device wherein the crank further include a handle substantially parallel and offset relative to crank shaft rotation axis when the crank is in the crank mounted configuration.

There may also be provided a device further comprising a gear mounted to the crank assembly shaft and jointly rotatable therewith and a pawl mounted adjacent the gear and positionable so as to engage the gear to prevent rotation thereof in a predetermined direction.

There may also be provided a device wherein the pawl is alternatively positionable in a pawl clockwise blocking position and a pawl counterclockwise blocking position wherein the pawl respectively blocks clockwise and counterclockwise rotations of the gear when viewed from the crank distal end while allowing respectively counterclockwise and clockwise rotations of the gear when viewed from the crank distal end.

There may also be provided a device further comprising a crank shaft mounting bracket securable to the container, the crank assembly shaft being mounted to the crank shaft mounting bracket and axially rotatable relative thereto, the pawl being pivotally mounted to the crank shaft mounting bracket at a pivot provided above and vertically aligned with the crank assembly shaft when the crank assembly shaft is operatively mounted to the container so as to be movable between the pawl clockwise and counterclockwise blocking positions.

There may also be provided a device further comprising a crank shaft mounting bracket securable to the container, the crank assembly shaft being mounted to the crank shaft mounting bracket and axially rotatable relative thereto, a handle securing bracket extending from the crank shaft mounting bracket and defining a recess receiving part of the crank in the crank stowed configuration to secure the crank in the crank stowed configuration.

There may also be provided a device wherein the device is mountable to the container so that the crank assembly shaft distal end is adjacent the container peripheral wall and so that the crank protrudes from the container peripheral wall in prolongation of the crank assembly shaft in the crank mounted configuration and the crank is vertically above the crank and withdrawn in register with and parallel to the container peripheral wall in the crank stowed configuration.

There may also be provided a device wherein the tarpaulin manipulator includes a rod defining a rod longitudinal axis, the rod being movable between rod first and second positions wherein the rod is respectively substantially adjacent the aperture first and second ends, the tarpaulin being mounted to the rod at the tarpaulin second end to allow rolling of the tarpaulin thereonto and unrolling of the tarpaulin therefrom when the rod is rotated about the rod longitudinal axis; the transmission assembly is operatively coupled to the crank assembly shaft and to the rod for transmitting rotations of the crank assembly shaft to the rod so that rotation of the crank assembly shaft about the crank shaft rotation axis causes rotation of the rod about the rod longitudinal axis; with the crank in the crank mounted configuration, rotating the crank in a first direction about the crank shaft rotation axis operates the tarpaulin manipulator in the retracting mode by rolling the tarpaulin around the rod and moving the rod towards the rod first position to move the tarpaulin to the tarpaulin retracted configuration and rotating the crank in a second direction opposite the first direction about the crank shaft rotation axis operates the tarpaulin manipulator in the extending mode by unrolling the tarpaulin from the rod and moving the rod towards the rod second position to move the tarpaulin to the tarpaulin extended configuration.

In another broad aspect, there is provided a covered vehicle container comprising the device as described above.

Advantageously, the proposed actuator assembly includes a crank that can be easily and effectively stowed when not needed without increasing significantly the cost of a tarpaulin extension and retraction system in which the crank is used.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 4, in a perspective view, illustrates an actuator assembly part of the device of FIGS. 1 to 3, the actuator assembly being shown in a motorized configuration;

FIG. 5, in a perspective view, illustrates the actuator assembly of FIG. 4, the actuator assembly being shown in a manual configuration;

FIG. 6, in a side elevation view, illustrates a mounting bracket part of the device of FIGS. 1 to 3, along with the actuator assembly of FIGS. 4 and 5 and part of a transmission assembly part of the device of FIGS. 1 to 3;

FIG. 7, in a perspective view, illustrates the mounting bracket of FIG. 6;

FIG. 8, in a partial perspective exploded view, illustrates the actuator assembly of FIGS. 4 and 5;

FIG. 9, in a cross-sectional view along section line IX-IX of FIG. 7, illustrates the actuator assembly of FIGS. 4, 5 and 8 in the motorized configuration;

FIG. 10, in a cross-sectional view along section line IX-IX of FIG. 7, illustrates the actuator assembly of FIGS. 4, 5, 8 and 9 in the manual configuration;

FIG. 11, in a partial perspective view, illustrates a first embodiment of a biasing element usable in the device of FIGS. 1 to 3;

FIG. 12, in a perspective view of bubble XII of FIG. 1, illustrates a second embodiment of a biasing element usable in the device of FIGS. 1 to 3;

FIG. 13, in a perspective view of bubble XIII of FIG. 1, illustrates a third embodiment of a biasing element usable in the device of FIGS. 1 to 3;

FIG. 22, in a perspective view, illustrates the actuator assembly of FIG. 21;

FIG. 23, in a cross-sectional view along section line XXIII-XXIII of FIG. 22, illustrates part of the actuator assembly of FIG. 21 in the motorized configuration;

FIG. 24, in a cross-sectional view along section line XXIII-XXIII of FIG. 22, illustrates part of the actuator assembly of FIG. 22 in the manual configuration;

FIG. 27A, in a perspective view, illustrates yet an other alternative embodiment of an actuator assembly, shown in a first configuration;

FIG. 27C, in a perspective view, illustrates the actuator assembly of FIGS. 27A and 27B, shown in a third configuration;

FIG. 28A, in a cross-sectional view axially midway through a crank assembly shaft thereof, illustrates the actuator assembly of FIGS. 27A to 27C, shown in the first configuration;

FIG. 28C, in a cross-sectional view axially midway through the crank assembly shaft, illustrates the actuator assembly of FIGS. 27A to 28B, shown in the third configuration.

DETAILED DESCRIPTION

Figure 1:
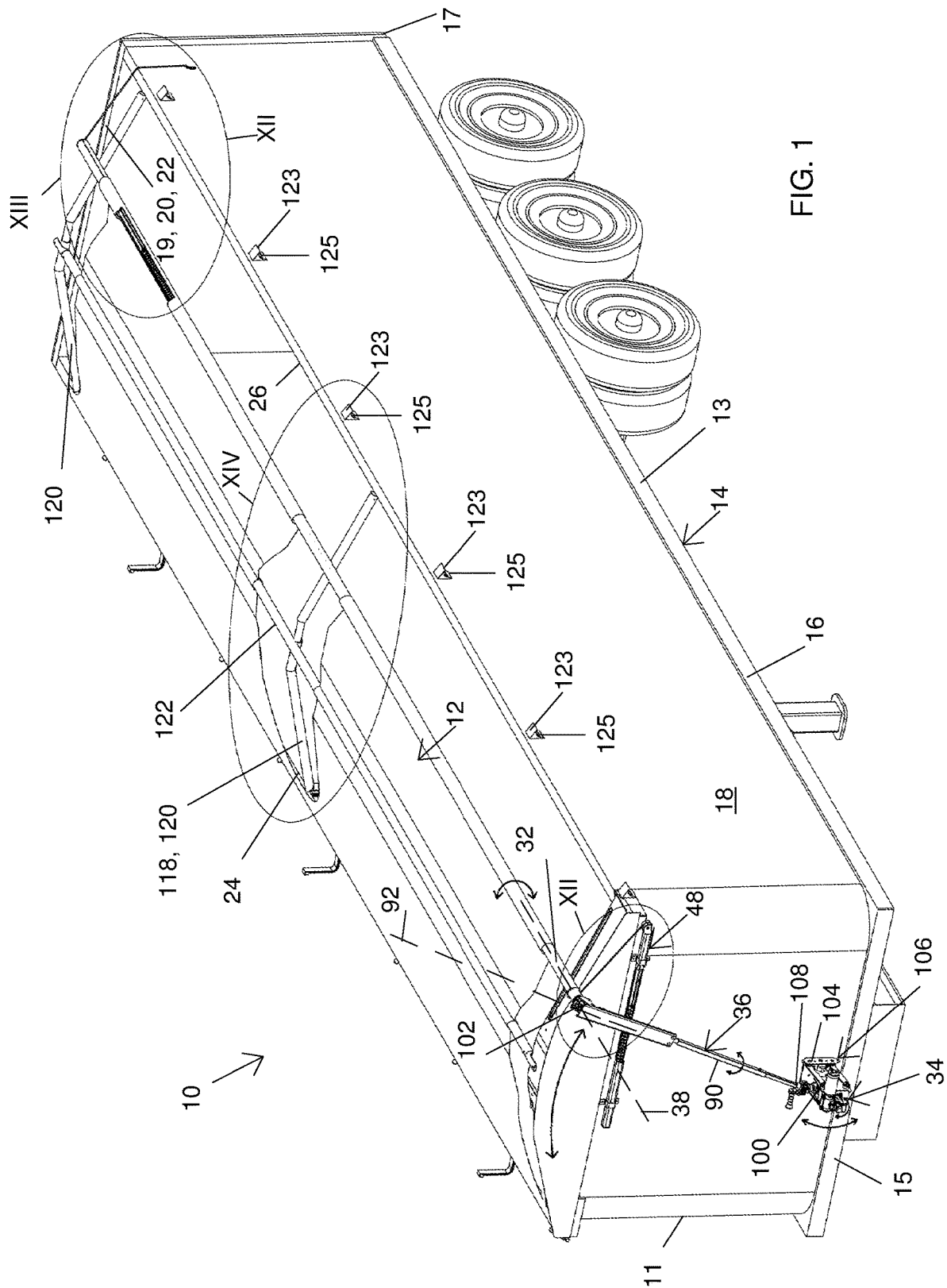
FIG. 1, in a perspective view, illustrates a container and a device for handling a tarpaulin to cover at least part of a container using the tarpaulin in accordance with an embodiment of the present invention, the tarpaulin being shown in a configuration intermediate a retracted configuration and an extend configuration.

Referring to FIG. 1 for example, there is shown a device 10 for handling a tarpaulin 12 to cover at least part of a container 14 using the tarpaulin 12. Typically, the container 14 defines a container bottom wall 16, a container peripheral wall 18 extending therefrom and a container top aperture 20 delimited by a container top edge 19 of the container peripheral wall 18 substantially opposed to the container bottom wall 16. The present invention is however also usable to cover other structures that may lack the container bottom wall 16 or part of the container peripheral wall 18.

The container top aperture 20 defines an aperture first end 24 and a substantially opposed aperture second end 26. The tarpaulin 12 defines a tarpaulin first end 28 and a substantially opposed tarpaulin second end 30, as seen for example in FIG. 15. The tarpaulin 12 is secured to the container 14 at the tarpaulin first end 28 substantially opposed to the aperture second end 26 and is movable between tarpaulin retracted and extended configurations in which the tarpaulin 12 is respectively substantially retracted from the container top aperture and 20 extended across the container top aperture 20, as seen respectively in FIGS. 2 and 3.

Returning to FIG. 1, the container 14 defines opposed container first and second ends 11 and 13 and opposed container first and second sides 15 and 17 each extending between the container first and second ends 11 and 13. The aperture first and second ends 24 and 26 are provided respectively at the container first and second ends 11 and 13.

The container 14 is typically part of a vehicle or a trailer to be pulled by a vehicle. For example, the container 14 is mountable on a platform truck, an open top truck trailer or the bin of a dump truck, among other possibilities. However, the device 10 is usable with other suitable containers 14. In some embodiments, the device 10 is usable to cover a railroad car.

Figure 2:
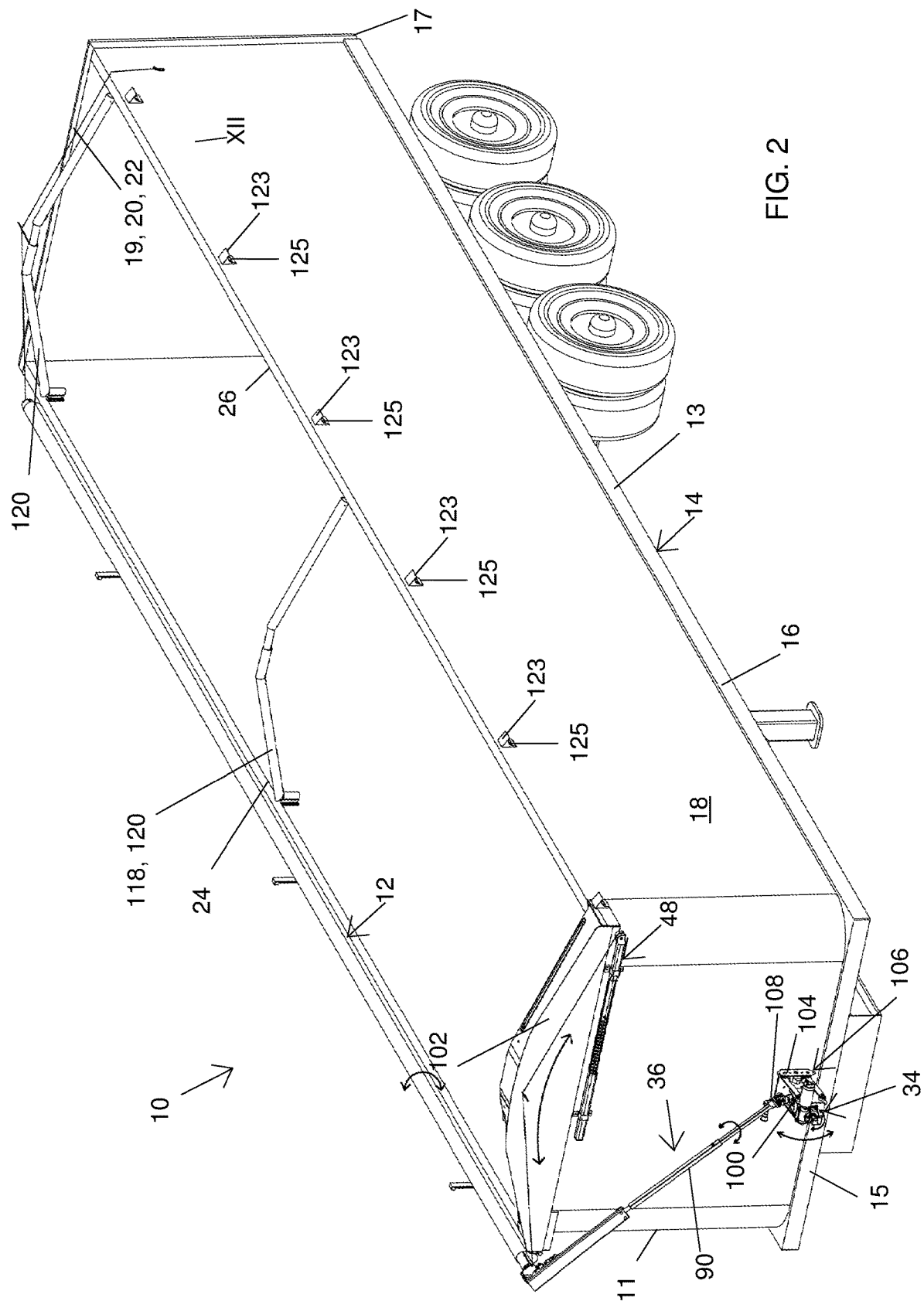
FIG. 2, in a perspective view, illustrates the container and device of FIG. 1, the tarpaulin being shown in the retracted configuration.
Figure 3:
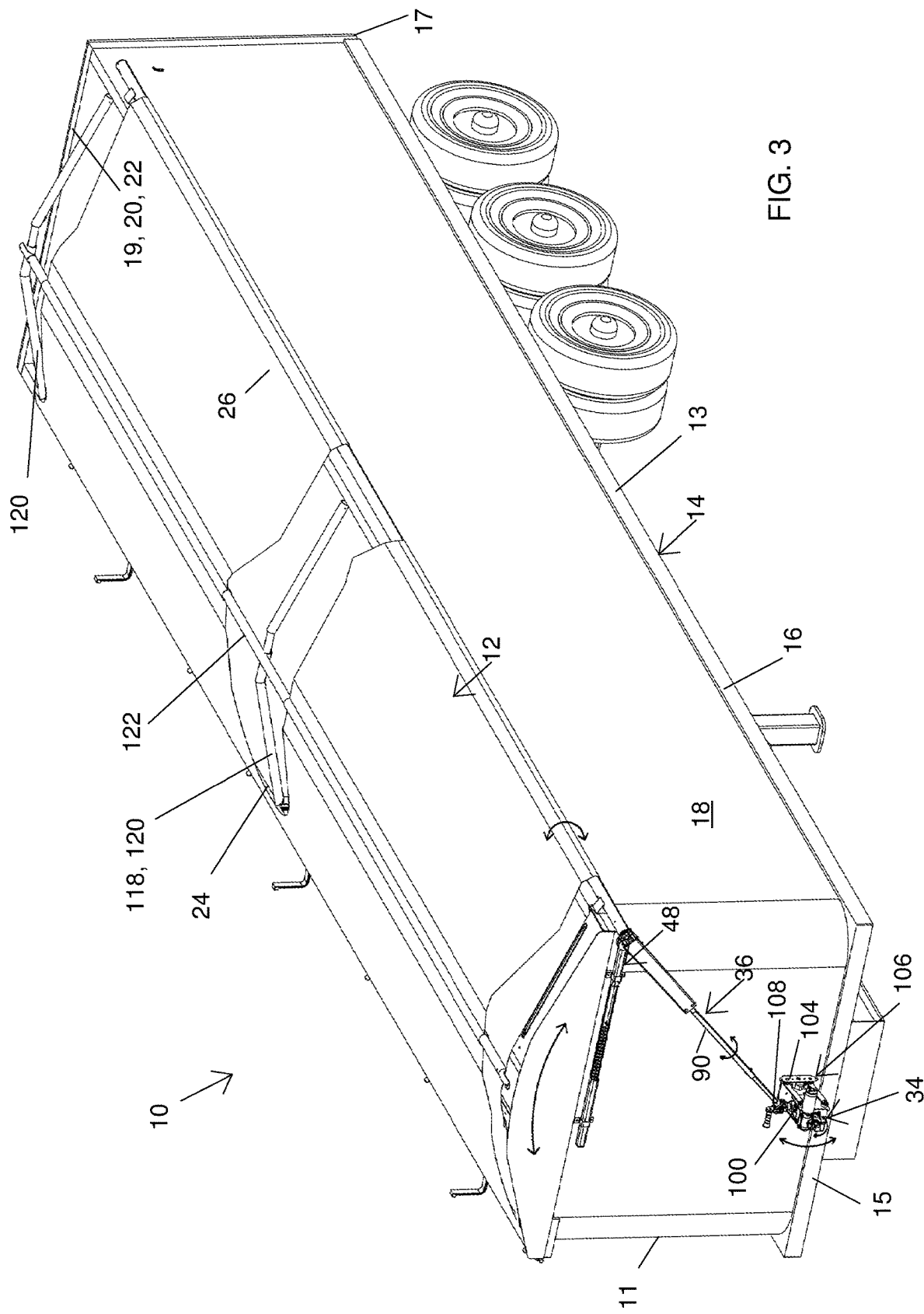
FIG. 3, in a perspective view, illustrates the container and device of FIGS. 1 and 2, the tarpaulin being shown in the extended configuration.
Figure 14:
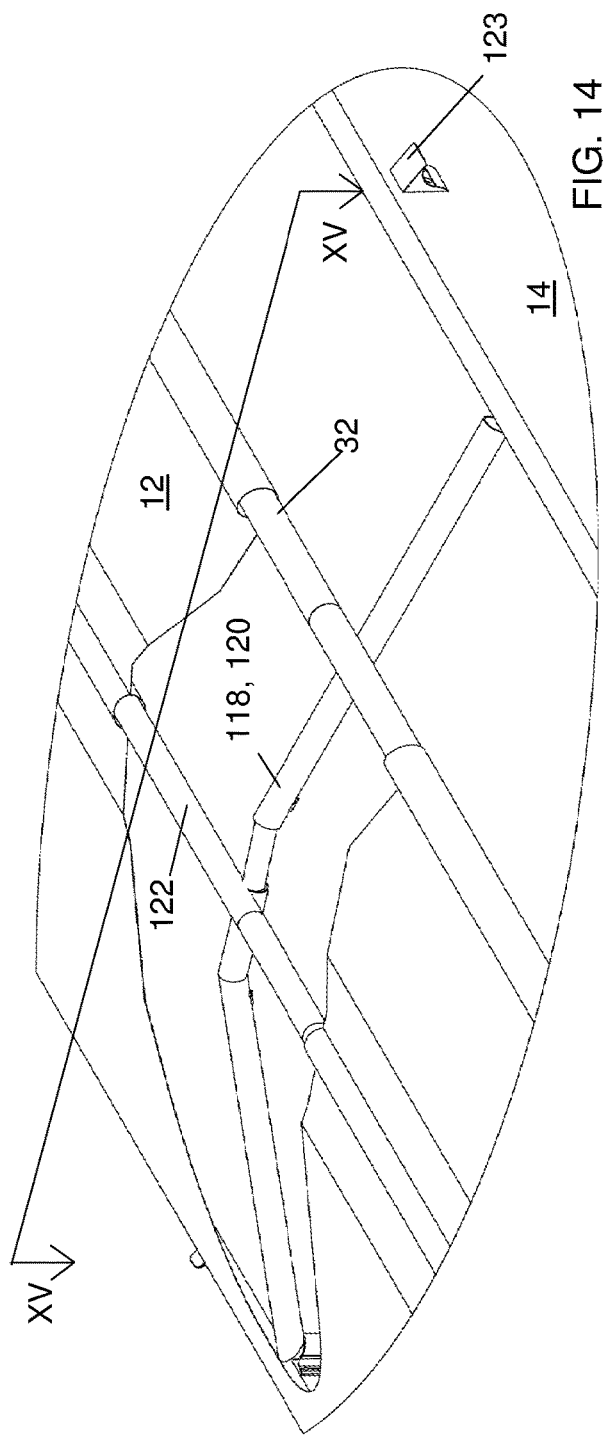
FIG. 14, in a perspective view of bubble XIV OF FIG. 1, illustrates an arch part of the container of FIGS. 1 to 3.

It should be noted that the aperture first and second ends 24 and 26 are not necessarily at the front or rear of the container 14, front and rear being related to the direction in which the container 14 is moved by the vehicle. As shown in the drawings, the aperture first and second ends 24 and 26 may be on edges of the container 14 that extend parallel to the direction of motion of the container 14 in typical operation. In the context of a movable container 14, FIGS. 1 to 3 illustrate a case in which the container 14 is moved in a direction perpendicular to a line joining the aperture first and second ends 24 and 26. The tarpaulin 12 is therefore retracted laterally relative to the direction of motion. However, it is within the scope of the invention to have tarpaulins 12 retractable along the direction of motion.

The term "substantially" is used throughout this document to indicate variations in the thus qualifies terms. These variations are variations that do not materially affect the manner in which the invention works and can be due, for example, to uncertainty in manufacturing processes or to small deviations from a nominal value that do not cause significant changes to the invention. These variations are to be interpreted from the point of view of the person skilled in the art. Also, directional terminology such as below and horizontal, among others, is used in this document and refer to the device 10 and container 14 in a typical operational configuration. This terminology is used for clarity reasons and should not be used to restrict the scope of the appended claims unless explicitly mentioned in the claims.

The tarpaulin 12 may be directly secured to the container 14, or may be secured thereto indirectly, for example through anchoring straps (not shown in the drawings) that extend between the tarpaulin 12, at the tarpaulin first end 28 for example, and the container 14. When present, the anchoring straps are secured to the container 14, for example to the container peripheral wall 18 below the aperture first end 24. The tarpaulin 12 is secured to the container 14 substantially opposed to the aperture second end 26 so that when extended, the tarpaulin 12 extends across the container top aperture 20. To that effect, the tarpaulin 12 may be secured to the container peripheral wall 18 below the aperture first end 24 or adjacent the aperture first end 24, among other possibilities.

The device 10 includes a rod 32, an actuator assembly 34 and a transmission assembly 36. The transmission assembly 36 is provided between the rod 32 and the actuator assembly 34 and transmits rotation produced in the actuator assembly 34 to the rod 32 so that the latter can be used to extend and withdraw the tarpaulin 12.

More specifically, the rod 32 defines a rod longitudinal axis 38. The rod 32 is movable between rod first and second positions, seen respectively in FIGS. 2 and 3, wherein the rod 32 is respectively substantially adjacent the aperture first and second ends 24 and 26. The tarpaulin 12 is mountable to the rod 32 at the tarpaulin second end 30 to allow rolling of the tarpaulin 12 thereonto and unrolling of the tarpaulin 12 therefrom when the rod 32 is rotated about the rod longitudinal axis 38.

As seen for example in FIGS. 4 and 5, the actuator assembly 34 includes a motor 40, a crank 42, and a driving shaft 44 defining a substantially longitudinal driving shaft rotation axis 46. In some embodiments, but not necessarily, the actuator assembly 34 also includes an actuator body 47 to which the motor 40, crank 42, and driving shaft 44 are mounted. The actuator assembly 34 is configurable between a motorized configuration and a manual configuration, seen for example respectively in FIGS. 4 and 5. In the motorized configuration, the motor 40 is mechanically coupled to the driving shaft 44 for selectively rotating the driving shaft 44 about the driving shaft rotation axis 46 when the motor 40 is powered. In the manual configuration, the motor 40 is uncoupled from the driving shaft 44 and the crank 42 is mechanically coupled to the driving shaft 44 so that the crank 42 is usable to selectively rotate the driving shaft 44 independently of the motor 40. More details regarding the structure and operation of the actuator assembly 34 are provided hereinbelow.

The motor 40 is any suitable motor, such as for example and non-limitingly an electrical motor, an hydraulic motor or a pneumatic motor connected to a suitable power supply and to a controller (both not shown in the drawings) in a conventional manner. The controller allows to selectively cause the motor 40 to turn in a selected direction by suitably powering the motor 40, and to selectively remove power to the motor 40.

The transmission assembly 36 is provided between the actuator assembly 34 and the rod 32. The transmission assembly 36 is operatively coupled to the actuator assembly 34 and to the rod 32 for transmitting rotations of the driving shaft 44 to the rod 32 so that rotation of the driving shaft 44 about the driving shaft rotation axis 46 causes rotation of the rod 32 about the rod longitudinal axis 38. More details regarding the structure and operation of the transmission assembly 36 are provided hereinbelow.

Rotating the rod 32 using the actuator assembly 34 to roll the tarpaulin 12 therearound moves the rod 32 towards the rod first position to move the tarpaulin 12 to the tarpaulin retracted configuration. Rotating the rod 32 using the actuator assembly 34 to unroll the tarpaulin 12 therefrom moves the rod 32 towards the rod second position to move the tarpaulin 12 to the tarpaulin extended configuration. By selecting the manual or motorized configuration of the actuator assembly 34, the device 10 can be operated respectively manually, without an external power source, and motorized, by energizing the motor 40 with a suitable power source.

Returning to FIG. 1, typically, at least one biasing element 48 is operatively coupled to the rod 32 for biasing the rod 32 towards the rod second position. Indeed, in a typical embodiment, the tarpaulin 12 is not rigid enough to push the rod 32 towards the rod second position when the tarpaulin 12 is unrolled from the rod 32. Therefore, this movement must be caused separately, for example using the biasing element 48. However, in alternative embodiments, this movement may be provided in any other suitable manner, for example passively if the tarpaulin is rigid enough, or under the action of gravity if the top aperture peripheral edge 22 is slanted. In yet other embodiments, a motor may be used to move the rod 32 towards the rod second position. Movements of the rod 32 towards the rod first position are usually automatically achieved are rolling the tarpaulin 12 around the rod 32 reduces a distance between the rod and the aperture first end 24.

Referring to FIGS. 8, 9 and 10, an exemplary embodiment of the actuator assembly 34 is now described in greater details. The reader skilled in the art will appreciate that different actuator assemblies are within the scope of the appended claims. Non-limiting examples of alternative actuator assemblies are described hereinbelow.

In the actuator assembly 34, the motor 40 is not directly coupled to the driving shaft 44. Instead, the actuator assembly 34 includes an intermediate shaft 52 mechanically coupled to the motor 40 so as to be rotatable thereby and a shaft coupling element 54. The intermediate shaft 52 defines a shaft passageway 53 extending longitudinally therethrough coaxially with the driving shaft rotation axis 46. The driving shaft 44 extends in the shaft passageway 53 and protrudes therefrom. In the actuator assembly 34, the driving shaft 44 protrudes at both ends from the shaft passageway 53. However, in other embodiments the driving shaft 44 may protrude only at one end thereof from the shaft passageway 53.

The shaft coupling element 54 is movable between coupling and uncoupling configurations, seen respectively in FIGS. 9 and 10. In the coupling configuration, the shaft coupling element 54 couples the intermediate shaft 52 and driving shaft 44 to each other so that the motor 40 and driving shafts 44 are jointly rotatable about the driving shaft rotation axis 46. In the uncoupling configuration, the driving shaft 44 is rotatable about the driving shaft rotation axis 46 independently from the intermediate shaft 52, and therefore independently from the motor 40.

The shaft coupling element 54 may take any suitable form. The shaft coupling element 54 takes the form of an element that may selectively couple the driving and intermediate shafts 44 and 52 to each other so that the intermediate shafts 44 and 52 are jointly rotatable.

For example, and non-limitingly, intermediate shaft 52 defines an intermediate shaft coupling portion 56 and the driving shaft 44 defines a driving shaft coupling portion 58. The shaft coupling element 54 secures the intermediate and driving shaft coupling portions 56 and 58 to each other in the coupling configuration. In the uncoupling configuration, the intermediate and driving shaft coupling portions 56 and 58 are free to rotate relative to each other. Typically, the intermediate and driving shaft coupling portions 56 and 58 are substantially adjacent to each other.

For example, the intermediate shaft 52 includes a substantially cylindrical intermediate shaft main portion 57 and the intermediate shaft coupling portion 56 extends integrally from the intermediate shaft main portion 57 at one end thereof so that the intermediate shaft main portion 57 and intermediate shaft coupling portion 56 are jointly rotatable. Similarly, the driving shaft 44 includes a substantially cylindrical driving shaft main portion 59 and the driving shaft coupling portion 58 extends integrally from the driving shaft main portion 59 at one end thereof so that the driving shaft main portion 59 and driving shaft coupling portion 58 are jointly rotatable. The driving shaft main portion 59 extends through the intermediate shaft coupling and main portions 56 and 57 and the driving shaft coupling portion 58 protrudes from the intermediate shaft 52.

In a specific embodiment, the shaft coupling element 54 includes a collar 60. The collar 60 receives thereinto and overlaps at least part of each of the intermediate and driving shaft coupling portions 56 and 58 in the coupling configuration. In the uncoupling configuration, the collar 60 is completely removed from the intermediate and driving shaft coupling portions 56 and 58, or overlaps only one of the intermediate and driving shaft coupling portions 56 and 58.

The collar 60 may be coupled to the intermediate and driving shaft coupling portions 56 and 58 in any suitable manner in the coupling configuration to ensure that the intermediate and driving shaft coupling portions 56 and 58 are jointly rotatable. For example, the intermediate and driving shaft coupling portions 56 and 58 each have a transversal cross-sectional configuration lacking continuous rotational symmetry, such as, for example and non-limitingly, a substantially polygonal transversal cross-sectional configuration. In other words, the intermediate and driving shaft coupling portions 56 and 58 each have a transversal cross-sectional configuration that differs from a circle. The collar 60 is hollow and substantially fittingly receives the intermediate and driving shaft coupling portions 56 and 58 so that in the coupling configuration, the collar 60 is jointly rotatable about the driving shaft rotation axis 46 along with the intermediate and driving shafts 52 and 44.

In some embodiments, the shaft coupling element 54 is selectively lockable in the coupling configuration. However, in other embodiments, this is not the case. More specifically, for example, the shaft coupling element 54 also includes a locking pin 64. At least one of the intermediate and driving shaft coupling portions 56 and 58, the driving shaft coupling portion 58 in the embodiment shown in the drawings, defines a pin receiving aperture 66 extending laterally therethrough and the collar 60 defines a pair of collar apertures 68 extending laterally therethrough laterally opposed to each other. In the coupling configuration, the collar apertures 68 are in register with the pin receiving aperture 66 and the locking pin 64 is insertable through both the collar apertures 68 and the pin receiving aperture 66 to lock the shaft coupling element 54 in the coupling configuration. Removing the locking pin 64 from the the collar apertures 68 and the pin receiving aperture 66 then allows to slide the collar 60 relative to the intermediate and driving shaft coupling portions 56 and 58 to achieve the uncoupling configuration.

The motor 40 is coupled to the intermediate shaft 52 in any suitable manner. For example, referring to FIG. 8, the motor 40 includes a motor output shaft 70 and a worm gear 72 extends between the motor output shaft 70 and the intermediate shaft 52 coupling the motor 40 and the intermediate shaft 52 to each other so that the motor 40 can rotate the intermediate shaft 52. The worm gear 72 includes a worm 74 driven by the motor output shaft 70 and a worm wheel 76 extending radially outwardly from the intermediate shaft 52 and jointly rotatable therewith. The worm 74 engages the worm wheel 76. Typically, but not exclusively, the worm wheel 76 is permanently engaged with the worm 74 during normal operation of the device 10, whether the actuator assembly 34 is in the motorized or manual configurations.

The actuator body 47 is configured to securely mount thereto the motor 40, worm gear 72, intermediate shaft 52 and driving shaft 44. The actuator body 47 is mounted to the container 14 in any suitable manner. An example of such a suitable manner is further described hereinbelow.

In the manual configuration, the crank 42 is secured to the driving shaft 44, as seen in FIG. 5. In some embodiments, not shown in the drawings, the crank 42 is permanently secured to the driving shaft 44. However, in other embodiments, as illustrated in the drawings, the crank 42 is removably mountable to the remainder of the actuator assembly 34.

For example, the crank 42 includes a crank attachment portion 78, a crank handle 80 and a crank spacing portion 82 extending therebetween. The crank attachment portion 78 is mountable to a protruding portion of the driving shaft 44 that protrudes from the intermediate shaft 52 opposite to the transmission assembly 36. For example, the crank attachment portion 78 is removably mountable to the driving shaft coupling portion 58 when the collar 60 is withdrawn therefrom. To that effect, the crank attachment portion 78 defines a crank aperture 84 substantially snugly receiving the driving shaft coupling portion 58. When the crank 42 is mounted to the driving shaft coupling portion 58, the crank handle 80 is offset from the driving shaft rotation axis 46 and can be rotated about the driving shaft rotation axis 46 to turn the driving shaft 44 thereabout.

In some embodiments, The device 10 defines a crank receiving element 86, for example a collar opening substantially vertically, for receiving the crank 42 thereinto when the crank 42 is detached from the driving shaft 44. The crank receiving element is configured to that the crank attachment portion 78 and crank spacing portion 82 can be received therethrough, but so as to prevent the crank handle 80 from passing therethrough. Therefore, the crank 42 can be safely stowed when not in use.

The transmission assembly 36 transmits the rotation of the driving shaft 44 to the rod 32. In some embodiments, the actuator assembly 34 is provided close to the container bottom wall 16 so as to be relatively easily operable in the manual configuration. The transmission assembly 36 must therefore transmit this rotation of the driving shaft 44 up to the rod 32, which is provided adjacent the container top aperture 20.

In some embodiments, the transmission assembly 36 is configured and sized so that a distance between the driving shaft 44 and the rod 32 remains substantially constant as the rod 32 moves between the rod first and second positions. This may require in some embodiments that the actuator assembly 34 be mounted so as to be movable relative to the container 10.

More specifically, with reference to FIG. 1, in a specific embodiment, the transmission assembly includes an elongated arm 90 defining an arm longitudinal axis 92. The arm 90 defines substantially opposed arm first and second ends 94 and 96, seen for example respectively in FIGS. 4 and 13. As better seen in FIG. 4, The arm first end 94 is substantially adjacent to the driving shaft 44. As better seen in FIG. 13, the arm second end 96 is substantially adjacent to the rod 32. Returning to FIG. 1, the arm 90 is operatively coupled to the driving shaft 44 and rod 32 so that rotation of the driving shaft 44 about the driving shaft rotation axis (not shown in FIG. 1) causes rotation of the arm 90 about the arm longitudinal axis 92, which in turn causes rotation of the rod 32 about the rod longitudinal axis 38. The arm 90 extends substantially perpendicular to the rod 32 and is pivotable relative to the driving shaft 44 between arm first and second positions, shown respectively in FIGS. 2 and 3, wherein the rod 32 is respectively in the rod first and second positions.

In some embodiments, as shown in the drawings, the arm 90 is a fixed length arm so that a distance between the driving shaft 44 and the rod 32 is fixed. However, in other embodiments, the arm 90 may be a telescopic arm having a variable length. In such embodiments, the actuator assembly 34 may be fixed relative to the container 14.

The transmission assembly 36 also includes gearboxes and other components that allow pivotal movements of the arm 90 and allow transmission of the rotation of the driving shaft 44 to the rod 32. For example, the driving shaft 44 is substantially horizontal and the transmission assembly includes a first 90 degrees gearbox 100 between the arm 90 and the driving shaft 44 and a second 90 degrees gearbox 102 between the arm 90 and the rod 32. The arm 32 is coupled to the first 90 degrees gearbox 100 using a universal joint 104 to allow pivotal movement of the arm 90 between the arm first and second positions as the rod 32 moves between the rod first and second positions.

In some embodiments, the path of the rod 32 between the rod first and second positions differs from an arc segment centered on the universal joint 104 with a radius of curvature equal to the length of the arm 90. Therefore, the arm 90 needs to be telescopic, or the location about which the arm 90 pivots needs to move relative to the container 14. This last option is illustrated in the drawings.

More specifically, the device 10 includes a mounting bracket 106 secured to the transmission assembly 34 for mounting the transmission assembly 36 to the container peripheral wall 18. The mounting bracket 106 is configured and sized for allowing vertical movements the arm 90 relative to the container peripheral wall 18. This is achieved by suitably mounting part of the transmission assembly 36 thereto. In some embodiments, the actuator assembly 34 is also mounted to the mounting bracket 106.

Referring for example to FIG. 7, the mounting bracket 106 includes a base 108 fixedly secured to the container peripheral wall 18 (not shown in FIG. 7, and a bracket mobile portion 110 movable vertically relative to the container 14. The arm 90 is mechanically coupled to the bracket mobile portion 110 at the arm first end 94 so that the arm first end 94 is vertically movable along with the bracket mobile portion 110, for example through the first 90 degrees gearbox 100.

The mounting bracket 106 also includes a pair of levers 112 extending substantially parallel to each other and vertically spaced apart from each other. In some embodiments of the invention, two pairs of levers 112 are provided. The two pairs of levers 112 are substantially parallel to each other and spaced apart from each other in a direction leading between the container first and second ends 11 and 13. Each lever 112 is pivotally mounted at one end 114 thereof to the base 108 and pivotally mounted at another end 116 thereof to the bracket mobile portion 110.

The bracket mobile portion 110 takes for example the form of a frame to which other components may be secured. For example, the actuator assembly 34 is mounted to the bracket mobile portion 110, along with part of the transmission assembly 36. More generally, one of the actuator and transmission assemblies 34 and 36 is mounted to the bracket mobile portion 110. In the embodiment illustrates in FIGS. 6 and 7, the first 90 degrees gearbox 100 is mounted to the bracket mobile portion so as to be rotated by the actuator assembly 34.

As seen in FIG. 1, the base 108 is mounted to the container 14 on the container first side 15, for example substantially adjacent the container bottom wall 16 and substantially midway between the container first and second ends 11 and 13.

Any suitable container 14 may be used with the device 10. The tarpaulin 12 is supported by the container 14 when moving between the tarpaulin first and second positions. To that effect, the container 14 defines at least one tarpaulin support 118 extending between the container first and second ends 11 and 13 across the container top aperture 20. For example, the at least one tarpaulin support includes at least two arches 120 spaced apart from each other and each extending across the container top aperture 20 between the container first and second ends 11 and 13. In a specific non-limiting embodiment of the invention, three arches 120 are provided, one adjacent each of the container first and second sides 15 and 17, and a third one midway between the first two ones. However, any other suitable number of arches 120 is usable. Each arch 120 includes for example three rectilinear tubes joined sequentially to each other. In other embodiments (not shown in the drawings, the at least one tarpaulin support includes part of the top aperture peripheral edge 22 on which the rod 32 and/or tarpaulin 12 are supported.

Figure 15:
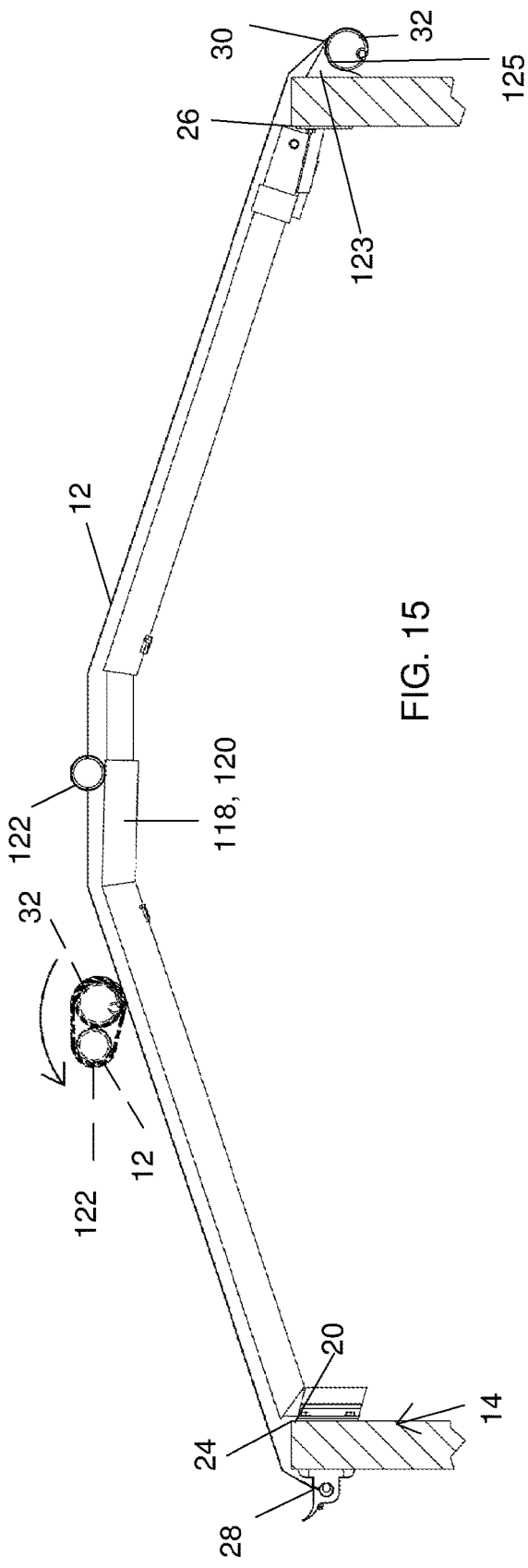
FIG. 15, in a side cross-sectional view along section line XV-XV of FIG. XIV, illustrates the tarpaulin of FIGS. 1 to 3, a long with a support rod usable to support a middle portion of the tarpaulin when the letter is in a tarpaulin extended configuration.

In some embodiments, a support rod 122 is mounted to the tarpaulin 12 at a location intermediate the tarpaulin first and second ends 28 and 30. For example the support rod 122 is provided so that when the tarpaulin 12 is in the extended configuration, the support rod 122 is midway between the aperture first and second ends 24 and 26 and extends along substantially the distance between the container first and second sides 15 and 17. As seen in FIG. 15, the support rod 122 is rolled around the rod 32 along with the tarpaulin 12 when the latter is sufficiently rolled around the rod 32.

Also, in some embodiments, anchoring blocks 123 are provided. The device 10 may include a plurality of anchoring blocks 123 spaced apart from each other along the container top aperture 20 substantially adjacent the aperture second end 26. The anchoring blocks 123 are provided slightly below the aperture second end 26 and each define a recess 125, for example an inverted J-shaped recess 125. The recess 125 opens generally towards a plane containing the container bottom wall 16 when the anchoring blocks 123 are operatively mounted to the container 14 and the recess 125 is configured and sized for receiving the rod 32 thereinto when arm 90 is in the arm second position.

FIGS. 11 to 13 illustrate respectively various biasing element 48b, 48 and 48a usable in the device 10. The device 10 typically includes two of these biasing elements 48, 48a and 48b, one provided at each end of the rod 32, but use of one or more than two biasing elements 48, 48a and 48b is within scope of the invention. When more than one biasing element 48, 48a and 48b are used, all the biasing elements 48, 48a and 48b may be of the same type, or various types may be mixed in the same device 10. All the types of biasing elements 48, 48a and 48b are provided to pull the rod 32 towards the rod second position.

Referring to FIG. 12, there is shown the biasing element 48. The biasing element 48 includes a coil spring 124 mounted in a tubular body 126 fixed to the container 14. One end of the coil spring 124 is fixed relative tubular body 126 (not shown in the drawings), and a cable 128 extends from the other end of the coil spring 124. The cable 128 is rolled around the rod 32 so that it unrolls therefrom when the rod 32 is moved towards the rod first position and is rolled therearound when the rod 32 is moved towards the rod second position. A tension is present in the coil spring 124 so that the cable 128 pulls on the rod 32 towards the rod second position.

Referring to FIG. 13, there is shown the biasing element 48a. The biasing element 48a includes a pulley 130 mounted rod 32 so as to be rotatable relative thereto. A torsion spring 132 extends between the pulley 130 and the rod 32. A cable 134 is rolled around the pulley 130 at one end thereof and is secured to the container 14 at the container second end 13 at the other end thereof. The torsion spring 132 is configured to exert a torque pulling on the cable 134 so that the cable 134 has a tendency to be rolled around the pulley 130, which biases the rod 32 towards the rod second position.

Referring to FIG. 11, there is shown the biasing element 48b. The biasing element 48b includes a coil spring 136 mounted in the rod 32, which is hollow along at least part thereof. One end of the coil spring 136 is fixed longitudinally relative rod 32 (not shown in the drawings), and a cable 138 extends from the other end of the coil spring 136. The cable 138 protrudes from the rod 32 and is fixed to the container 14 at the container second end 13. A tension is present in the coil spring 136 so that the cable 138 pulls on the rod 32 towards the rod second position.

Biasing elements similar to the biasing elements 48, 48a and 48b, and usable in the device 10 are further described in U.S. Pat. No. 6,595,594 issued Jul. 22, 2003 and U.S. Pat. No. 7,506,912 issued Mar. 24, 2009, both issued to Royer, and US Patent Application Publication 20020021018 of Royer published Feb. 21, 2002, the contents of which is hereby incorporated by reference in its entirety.

In operation, the device 10 works as follows. Taking for example as an initial configuration the configuration shown in FIG. 2 with the actuator assembly 34 in the motorized configuration, the arm 90 is in the arm first position. The rod 32 is thus in the rod first position with the tarpaulin 12 rolled therearound. The biasing element 48 biases the rod 32 towards the rod second position. However, the structure of the motor 40 and of the components linking the motor 40 to the rod 32 prevents the rod 32 from moving. It should be noted that in alternative embodiments other components, such as a lock, a clutch or a brake, prevent this movement instead.

When the motor 40 is rotated in a suitable direction, the intermediate shaft 52 is rotated through the worm gear 72. Since the shaft coupling element 54 is in the coupling configuration, the driving shaft 44 is then also rotated by the action of the motor 40, which turns the various elements of the transmission assembly 36 to rotate the rod 32 so that the tarpaulin 12 is released from the rod 32. The rod 32 is then free to move under the action of the biasing element 48 until the extended configuration is achieved. The bracket mobile portion 110 moves up and down due to the pivotal movement of the levers 112 as the tarpaulin moves between the tarpaulin retracted and extended configurations to endure that the rod 32 is always supported by the container 14. Retraction of the tarpaulin 12 is achieved by rotating the motor 40 in the opposite direction.

If for any reason the motor 40 cannot be used to operate the device 10, the actuator assembly 34 is moved to the manual configuration by sliding the collar 60 so that the driving shaft 44 is free to rotate relative to the intermediate shaft 52. Then, the crank 42 is mounted to the driving shaft 44 and can be used to rotate the rod 32 in either direction.

Figure 17:
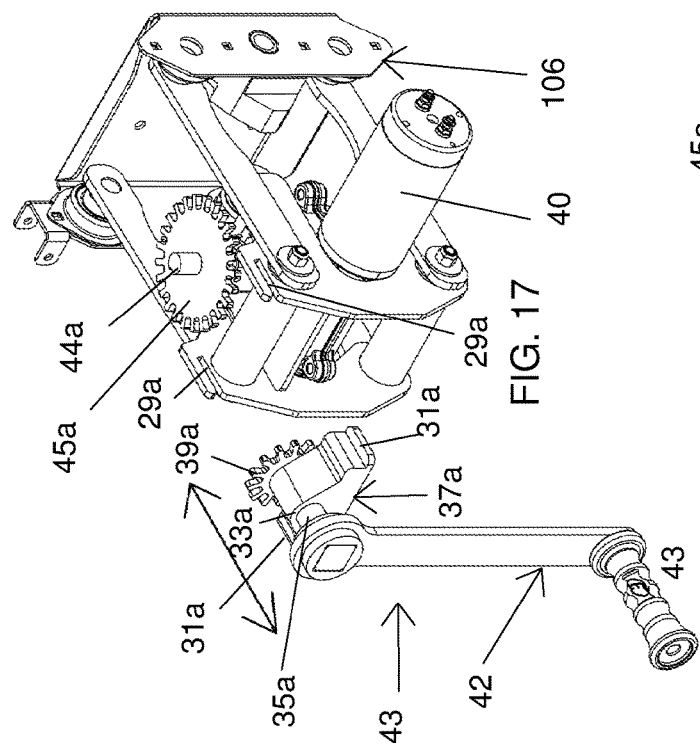
FIG. 17, in a perspective partially exploded view, illustrates the actuator assembly of FIG. 16.
Figure 18:
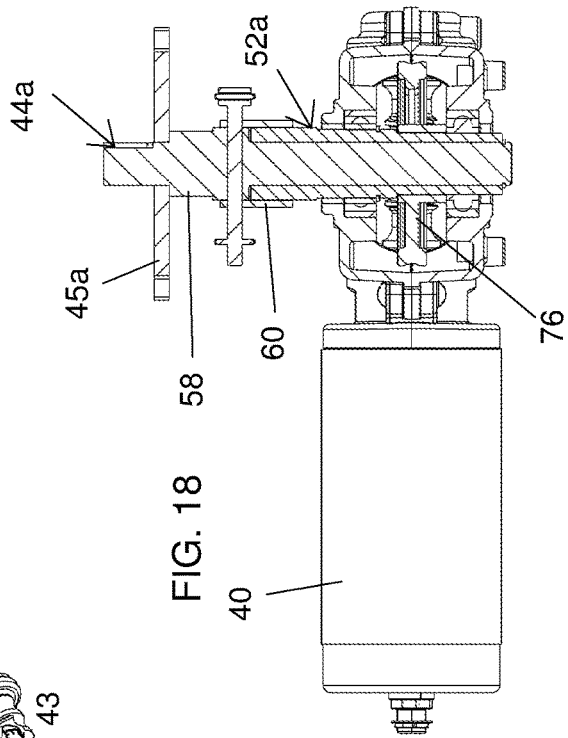
FIG. 18, in a partial side-cross-sectional view, illustrates the actuator assembly of FIGS. 16 and 17 in the motorized configuration.
Figure 16:
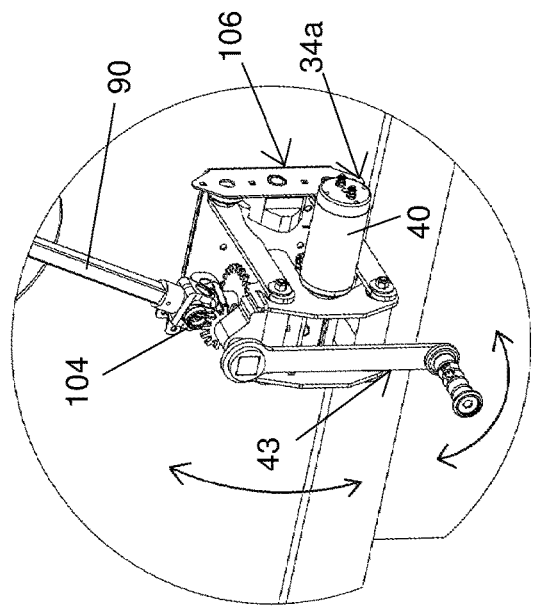
FIG. 16, in a perspective view, illustrates an alternative embodiment of an actuator assembly usable in the device of FIGS. 1 to 3, the actuator assembly being shown in a manual configuration.

FIGS. 16 to 18 illustrate an alternative actuator assembly 34a similar to the actuator assembly 34. The actuator assembly 34a is similar in structure and function to the actuator assembly 34 except that the driving shaft 44a is vertical and only needs to protrude from the intermediate shaft 52a at one end thereof. Since the driving shaft 44a is vertical, the first 90 degrees gearbox 100 can be omitted and the driving shaft 44a can be directly coupled to the universal joint 104.

As seen for example in FIG. 18, the driving shaft 44a is provided with a driving shaft gear 45a extending circumferentially therearound outside of the intermediate shaft 52, for example further away from the intermediate shaft coupling portion 56 than the driving shaft coupling portion 58. Referring to FIG. 17, the crank 42 is part of a crank assembly 43a including a crank gear 39a and a crank assembly body 37a. The crank 42 is operatively coupled to the crank gear 39a for selectively rotating the crank gear 39a relative to the crank assembly body 37a. The crank assembly body 37a is mountable to a remainder of the actuator assembly 34a so that the crank 42 and driving shaft gears 45a are engaged with each other, for example perpendicular to each other, so that rotating the crank 42 is may rotate the driving shaft 44a.

For example, the crank assembly 43a includes a crank assembly shaft 35a rotatably mounted in a suitably located and configured mounting aperture 33a extending through the crank assembly body 37a. The crank assembly shaft 35a protrudes at both ends thereof from the crank assembly body 37a. The crank 42 and crank gear 39a are mounted at respective ends of the crank assembly shaft 35a so that the crank 42, crank assembly shaft 35a and crank gear 39a are jointly rotatable.

The crank assembly body 37a is typically removably mountable to the remainder of the actuator assembly 34a so that when operatively mounted thereto, the crank gear 39a engages the driving shaft gear 45a so that rotating the crank gear 39a rotates the driving shaft gear 45a. For example, the crank assembly body 37a defines a pair of opposed tongues 31a each slidably receivable in a respective substantially horizontal slit 29a when the crank assembly 44a is operatively mounted to the remainder of the actuator assembly 34a. When the collar 60 is slid so that the driving shaft 44a and intermediate shaft 52a are uncoupled from each other, the crank 42 can be rotated to rotate the driving shaft 44a, as in the embodiment of the actuator assembly 34 described hereinabove.

Figure 21:
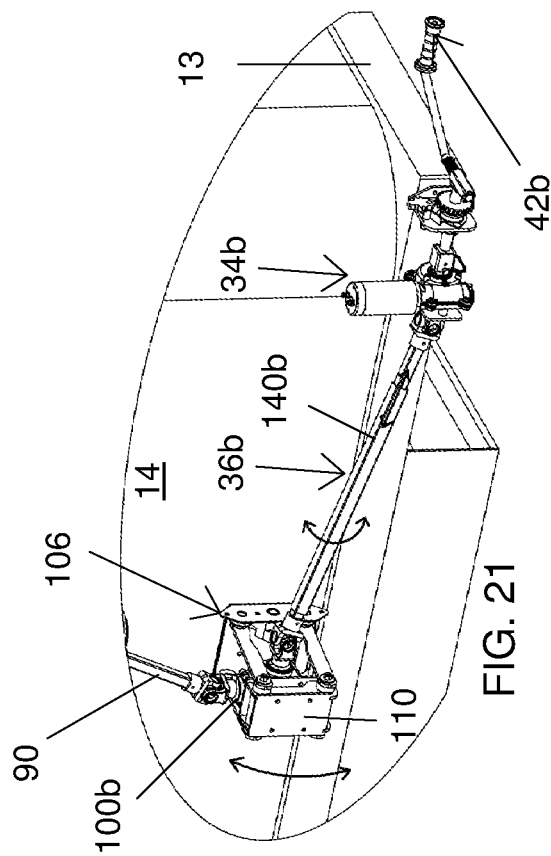
FIG. 21, in a perspective view, illustrates yet an other alternative embodiment of an actuator assembly and a transmission assembly usable in the device of FIGS. 1 to 3.

FIGS. 21 to 24 illustrate an alternative actuator assembly 34b and an alternative transmission assembly 36b. Referring to FIG. 21, instead of being located substantially midway between the container first and second ends 11 and 13, the actuator assembly 34b is provided at one of the container first and second ends 11 and 13, to facilitate access to the crank 42b by an intended user. More specifically, instead of being mounted directly to the mounting bracket 106, the actuator assembly 34b is mounted to the container 14 substantially adjacent to one of the container first and second ends 11 and 13 (the container second end 13 in the specific example illustrated in the drawings).

The transmission assembly 36b includes an intermediate gearbox 100b, replacing the first 90 degrees gearbox 100 and an extension shaft 140b. The extension shaft 140b extends between the driving shaft 44b and the intermediate gearbox 100b. The intermediate gearbox 100b is mounted to the bracket mobile portion 110, and the arm 90 is mounted to the intermediate gearbox 100b similarly to the manner in which the arm 90 is mounted to the first 90 degrees gearbox 100. The intermediate gearbox 100b is for example a 90 degrees gearbox. The actuator assembly 34b, extension shaft 140b, intermediate gearbox 100b and arm 90 are mechanically coupled to each other so that rotation of the driving shaft 44b about the driving shaft rotation axis 46 causes rotation of the arm 90 about the arm longitudinal axis 92. The extension shaft 140b is telescopic and is coupled to the driving shaft 44a and intermediate gearbox 100b with universal joints to accommodate vertical movements of the bracket mobile portion 110.

FIG. 22 better illustrate the actuator assembly 34b. The actuator body 47b is provided with an actuator body mounting bracket 150b securable to the container 14 (not shown in FIG. 22). The crank 42b is part of a crank assembly 43b including a crank assembly shaft 35b rotatably mounted in a suitably located and configured mounting aperture (not shown in the drawings) extending through a crank assembly body 37b mountable to the container 14. In some embodiments, the crank assembly shaft 35b may be mounted to the crank assembly body 37b using a bearing to facilitate its rotation. In alternative embodiments, the actuator assembly 34b has any other suitable configuration and is mounted to the container 14 in any other suitable manner.

The crank assembly shaft 35*b* protrudes at both ends thereof from the crank assembly body 37*b*. The crank assembly shaft 35*b* may extend integrally from the driving shaft 44*b*, or, as shown in FIGS. 23 and 24, may be coupled thereto axially through a bearing 31*b* opposed to the crank 42*b* (not shown in FIGS. 23 and 24). The bearing 31*b* allows the crank assembly shaft 35*b* and the driving shaft 44*b* to rotate freely relative to each other. To achieve the manual configuration, the collar 60 is moved to overlap a crank assembly shaft coupling portion 29*b* similar in cross-section to the driving shaft coupling portion 58, thereby allowing locked joint rotation of the crank assembly shaft 35*b* and driving shaft 44*b*. Motorized and manual configurations are illustrated in FIGS. 23 and 24 respectively.

When the bearing 31*b* is used, the crank 42 may be permanently left secured to the crank assembly shaft 35*b* as in motorized operation, the collar 60 is withdrawn from the crank assembly shaft coupling portion 29*b* and rotation of the driving shaft 44*b* does not cause rotation of the crank assembly shaft 35*b*.

In some embodiments, as seen in FIG. 21, the crank assembly 43*b* is provided with a ratchet type mechanism 27*b*. The ratchet type mechanism 27*b* is configurable to prevent rotation of the crank 42*b* in an undesired direction, while allowing rotation of the crank 42*b* in the opposite direction.

Figure 20:
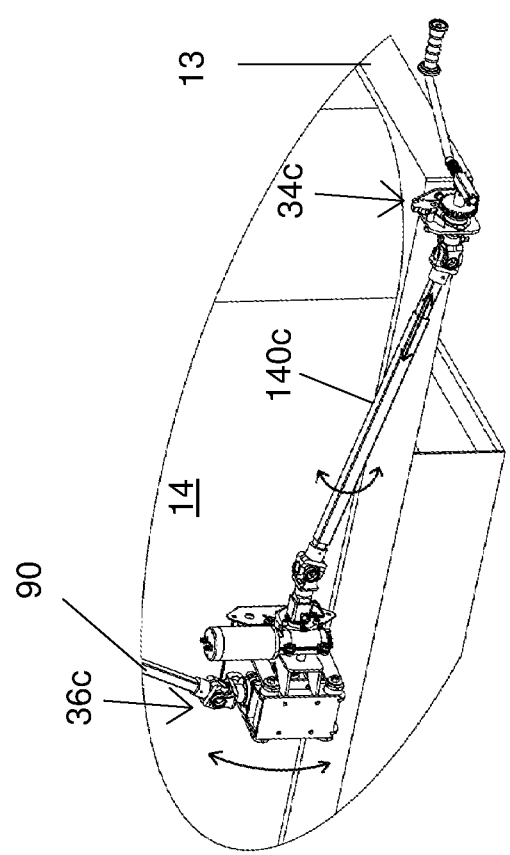
FIG. 20, in a perspective view, illustrates an other alternative embodiment of an actuator assembly and a transmission assembly usable in the device of FIGS. 1 to 3.

FIG. 20 illustrates illustrates yet another actuator and transmission assemblies 34*c* and 36*c* configuration. The actuator and transmission assemblies 34*c* and 36*c* are similar to the actuator and transmission assemblies 34*b* and 36*b* except that the extension shaft 140*c* is provided between the driving shaft 44*c* and the crank assembly shaft 35*b*, and is therefore part of the actuator assembly 34*c* instead of being part of the transmission assembly 36*c*. The driving shaft 44*c* is therefore directly attached to the intermediate gearbox 100*c*. Otherwise, the actuator and transmission assemblies 34*c* and 36*c* and the actuator and transmission assemblies 34*b* and 36*b* operate similarly and have similar structures.

Figure 19:
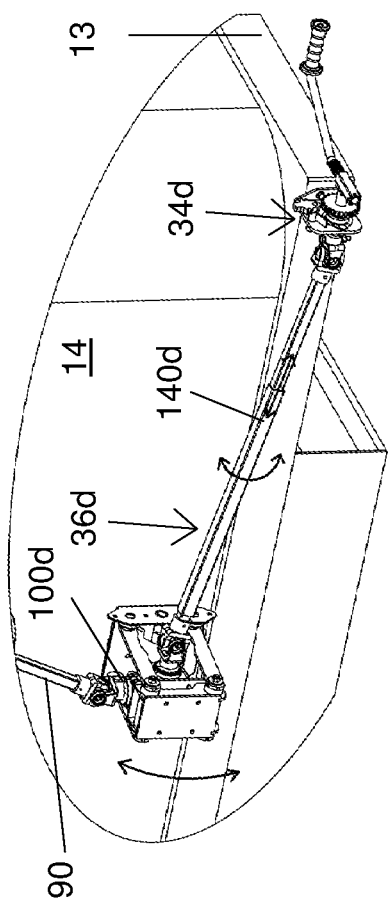
FIG. 19, in a perspective view, illustrates alternative embodiments of an actuator assembly and a transmission assembly usable in the device of FIGS. 1 to 3.

It should be noted that in some embodiments, the motor 40, worm gear 72 and intermediate shaft 52 are omitted and that in these embodiments, the actuator assembly 34, 34*a* or 34*b* is completely manually operated. In some of these embodiments, the actuator assembly may be similar to the actuator assembly 34, except for the absence of the components required for motorized operation. In other such embodiments, the actuator assembly 34*d* and transmission assembly 36*d* may be as illustrated in FIG. 19, which is similar to the actuator assembly 34*c* and transmission assembly 36*c*, except that the motor 40, worm gear 72 and intermediate shaft 52 are omitted. The extension shaft 104*d* is therefore coupled to the intermediate gearbox 100*d* for joint rotation therewith.

Figure 25:
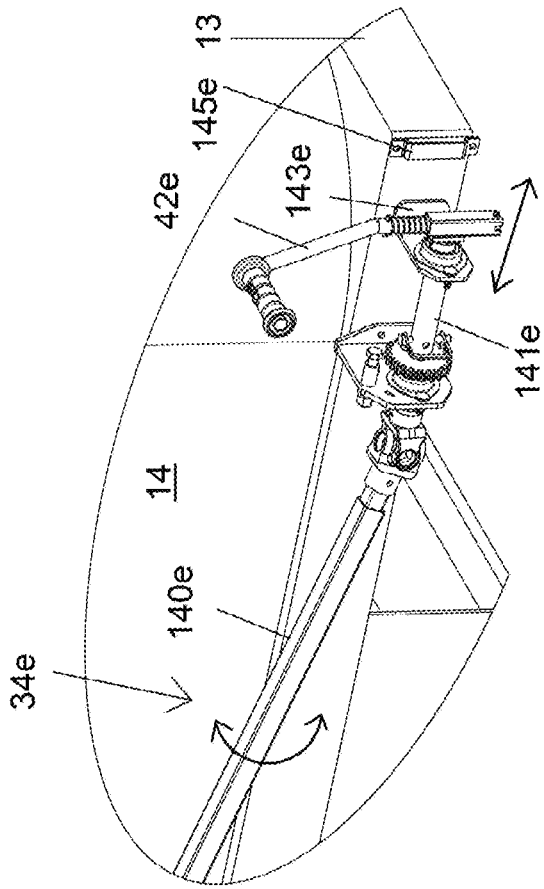
FIG. 25, in a partial perspective view, illustrates yet an other alternative embodiment of an actuator assembly and a transmission assembly usable in the device of FIGS. 1 to 3 shown here with a crank extension shaft thereof in a retracted configuration.
Figure 26:
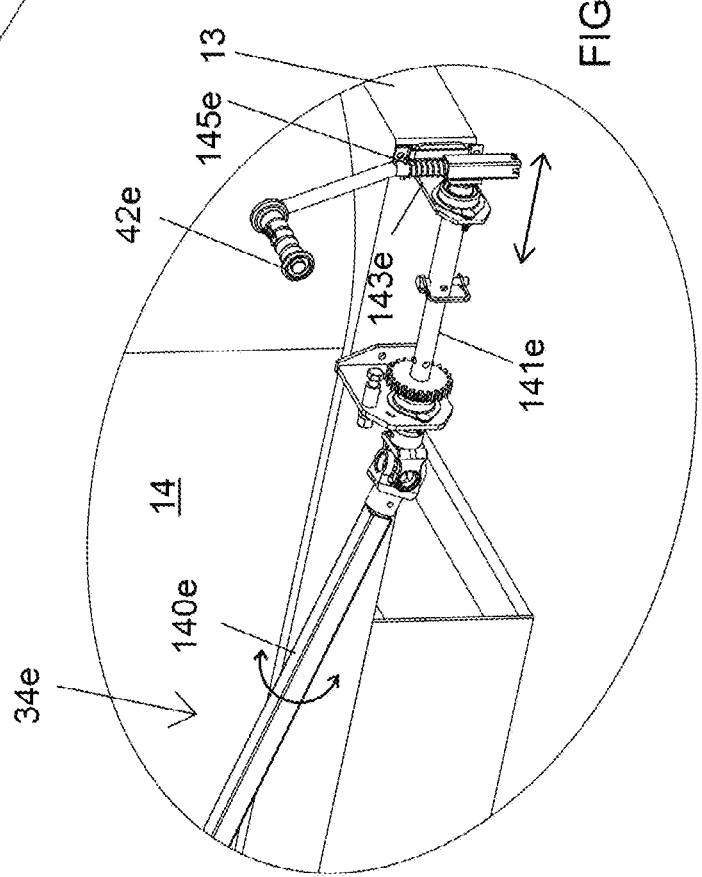
FIG. 26, in a partial perspective view, the actuator assembly of FIG. 25 shown here with the crank extension shaft in an extended configuration.

In yet other embodiments, as seen in FIGS. 25 and 26, an actuator assembly 34*e* is similar to the actuator assembly 34*d* except that the actuator assembly 34*e* includes a crank extension shaft 141*e* supporting the crank 42*e*. The crank extension shaft 141*e* is telescopic so as to be configurable between a retracted configuration (seen in FIG. 25) and an extended configuration (seen in FIG. 26). In the retracted configuration, the crank 42*e* is retracted from the container second end 33 so that the crank 42*e* is not exposed when not needed. In the extended configuration, the crank 32*e* protrudes from the container second end 33 so that the crank 42*e* can be operated as described hereinabove. In some embodiments, a crank securing member 143*e* is provided adjacent the crank 42*e* and engages a suitably shaped container securing member 145*e* to stabilize the crank 42*e* in the extended configuration.

In some embodiments, it would be desirable to have a crank that is permanently attached to the remainder of the actuator assembly while being located adjacent a corner of the container 14. However, such cranks would typically protrude from the container 14 and therefore be prone to accidental damage. FIGS. 27A to 27C and 28A to 28C illustrate an actuator assembly 34*f* that reduces risks of damages to the crank 42*f* by pivotally attaching the crank 42*f* to the remainder of the actuator assembly 34*f*. The actuator assembly 34*f* is similar to the manually operated portion of the actuator assembly 34*b*, and usable in replacement thereof, except for the crank 42*f*, and only the differences between the manually operated part of the actuator assembly 34*b* and the actuator assembly 34*f* are described herein. This actuator assembly 34*f* is usable also in purely manual systems not including an electric motor.

Referring for example to FIG. 28A, the crank assembly shaft 35*f* of the crank assembly 34*f* defines a crank engaging portion 200 to which the crank 42*f* may be mounted terminated by a crank assembly shaft distal end 201 typically located adjacent the container peripheral wall 18. The crank engaging portion 200 defines a crank engaging portion proximal part 202, adjacent the ratchet type mechanism 27*f*, and a crank engaging portion distal part 204 extending therefrom axially and terminating the crank assembly shaft 35*f*, in which the crank assembly shaft distal end 201 is provided. The crank engaging portion distal part 204 has a transversal cross-sectional configuration that is non round, similarly to the portion of the intermediate and driving shaft coupling portions 56 and 58 on which the collar 60 slides in the actuator assembly 34. For example, the crank engaging portion distal part 204 has a transversal cross-sectional configuration lacking continuous rotational symmetry, such as, for example and non-limitingly, a substantially polygonal transversal cross-sectional configuration. This allows proper engagement with the crank 42*f* so that the crank assembly shaft 35*f* can be rotated from the crank engaging portion distal part 204 by rotating the latter axially. For example, the crank engaging portion distal part 204 has a substantially square transversal cross-sectional configuration.

Figure 28B:
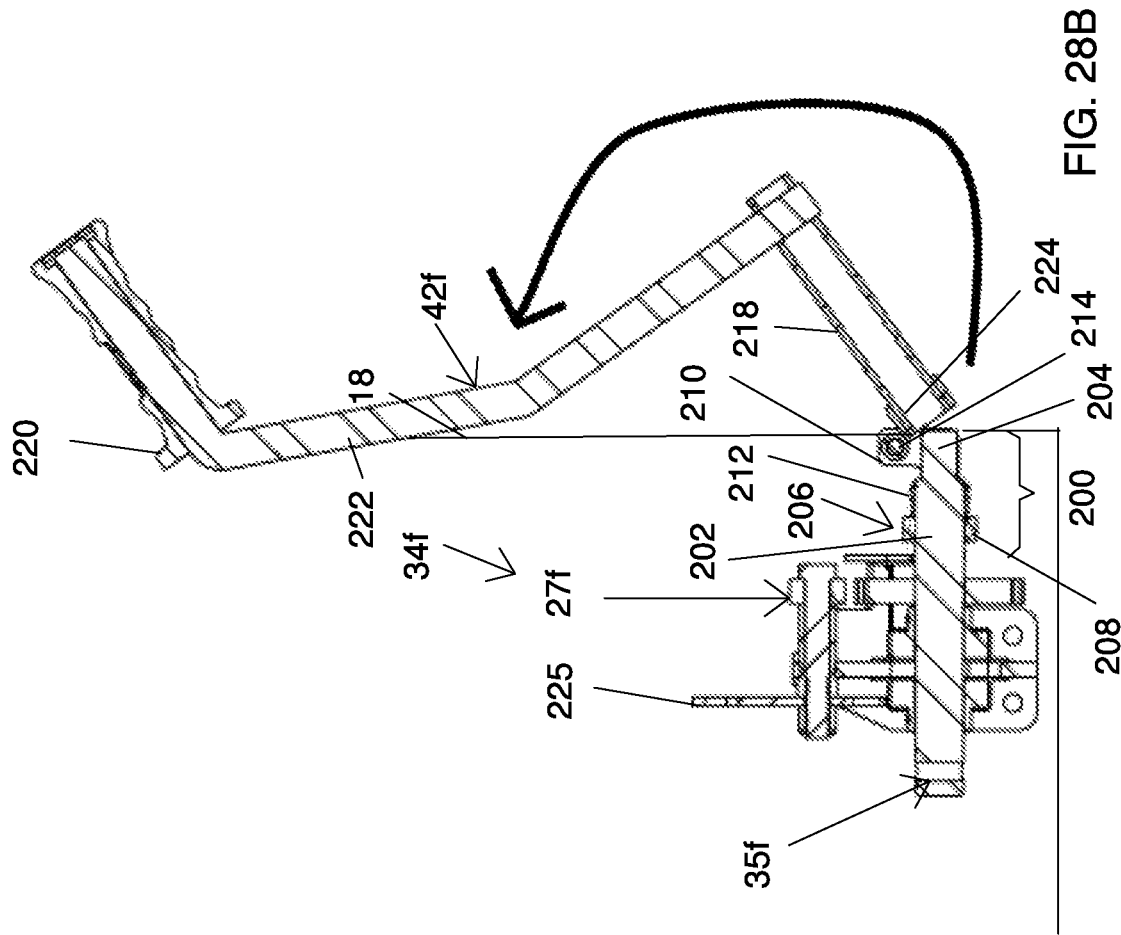
FIG. 28B, in a cross-sectional view axially midway through the crank assembly shaft, illustrates the actuator assembly of FIGS. 27A to 28A, shown in the second configuration.
Figure 27B:
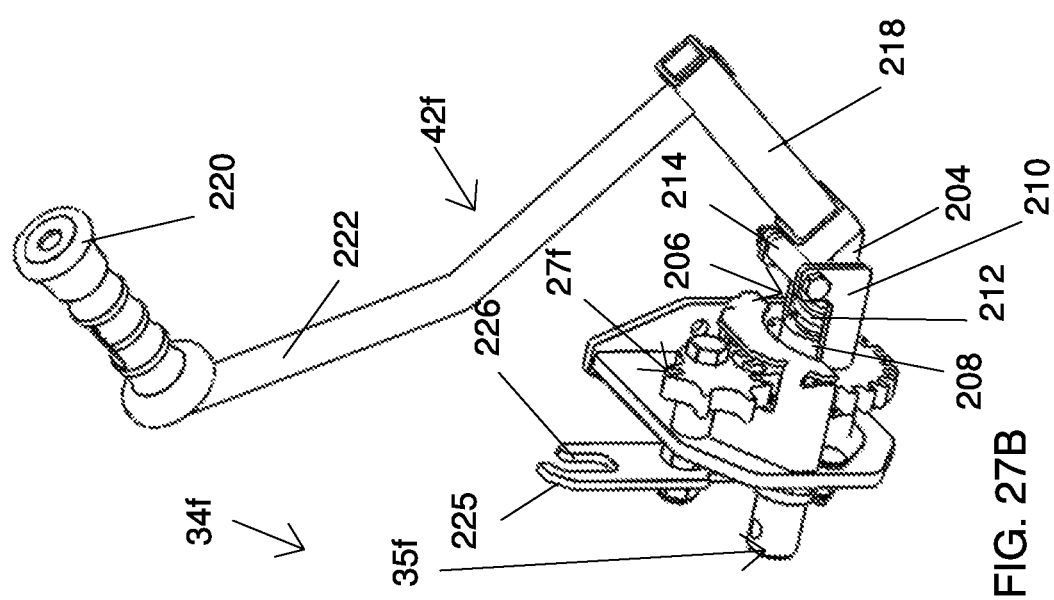
FIG. 27B, in a perspective view, illustrates the actuator assembly of FIG. 27A, shown in a second configuration.

A crank mount 206 is used to mount the crank 42*f* to the crank assembly shaft 35*f*. The crank mount 206 includes a collar 208, a crank mounting bracket 210 and a biasing element 212. The collar 208 is mounted to the crank engaging portion proximal part 202 so as to be axially movable therealong between a collar proximalmost position, as seen in FIGS. 27A and 28A, for example, and a collar distalmost position, as seen in FIGS. 27B and 28B, so that the crank mount is moved longitudinally along the crank assembly shaft 35*f* respectively to crank mount proximal and distal positions. The collar 208 is closer to the crank engaging portion distal part 204 in the collar distalmost position than in the collar proximalmost position. The collar 208 may be freely rotatable about the axis of the crank assembly shaft 35*f*.

Also, the crank 42*f* is pivotally mounted to the crank mount 206 so as to be pivotable about a pivot axis 207 perpendicular and laterally offset relative to the crank shaft rotation axis 228 between crank extended and retracted positions, seen respectively for example in FIGS. 27A and 27C.

The crank mounting bracket 210 extends from the collar 208 along the crank engaging portion 200, towards the crank engaging portion distal part 204 and includes a pivot 214 opposed to the collar 208. For example, the crank mounting bracket 210 includes a pair of L-shaped members extending parallel to each other and secured to each other through the pivot 214. The L-shaped members each include a main portion, provided on opposite sides of the crank assembly shaft 35f, and an offsetting portion extending perpendicular thereto and terminating offset from the crank assembly shaft 35f to allow mounting of the pivot 214 thereto. The pivot 214 is thus substantially perpendicular to the crank assembly shaft 35f and eccentric relative thereto. As further described hereinbelow, the crank 42f is mounted to the pivot 214 so as to be pivotable thereabout.

The biasing element 212 biases the collar towards the collar proximalmost position. For example, the biasing element 212 takes the form of a coil spring having its distal end fixed to the crank assembly shaft 35f. In a specific and non-limiting embodiment, the coil spring has its distal end welded or otherwise secured at the junction between the crank engaging portion proximal and distal parts 202 and 204. The remainder of the coil spring is free to move relative to the crank assembly shaft 35f and extends between the junction between the crank engaging portion proximal and distal parts 202 and 204 and the collar 208. Thus, when the collar 208 is moved towards the collar distalmost position, the coil spring is compressed, which creates a resistance to this movement.

The crank 42f includes a crank coupling portion 218, a handle 220 and a crank intermediate portion 222 extending therebetween. The crank coupling portion 218 defines a mounting recess 224 configured to receive the crank engaging portion distal part 204 thereinto. For example the crank coupling portion 218 is a tubular member having a central passageway that has a shape and dimensions substantially similar to those of the crank engaging portion distal part 204 so that the crank coupling portion 218 can be removed from the crank engaging portion distal part 204 while being able to drive rotation of the crank assembly shaft 35f when mounted thereto. The handle 220 is substantially parallel and offset relative to the tubular member, so that the handle 220 can be rotated in a circle about the crank shaft rotation axis 228 of the crank assembly shaft 35f to rotate axially the latter. Typically, the handle 220 is rotatable relative to the intermediate member to facilitate operation of the crank 42f.

The crank 42f is movable between a crank mounted configuration and a crank stowed configuration with the crank 42f and crank assembly shaft 35f remaining mechanically coupled to each other. In the crank mounted configuration, seen in FIGS. 27A and 28A, the crank coupling portion 218 is mounted on the crank engaging portion distal part 204 so as to be jointly rotatable therewith and the handle 220 is substantially parallel to the crank assembly shaft 35f, eccentric relative thereto. In this configuration, the crank 42f protrudes longitudinally from the crank assembly shaft 35f and protrudes from the container peripheral wall 18 in prolongation of the crank assembly shaft 35f. Then, the crank 42f may be used to rotate the crank assembly shaft 35f. In the crank stowed configuration, the crank coupling portion 218 is disengaged from the crank engaging portion distal part 204 and the crank 42f is pivoted about the pivot 214 so that most or all of the crank 42f no longer protrudes distally further than the crank engaging portion distal part 204 and is radially in register with the crank assembly shaft 35f. For example the crank 42f is vertically aligned with and above the remainder of the crank assembly 34f so that the crank 42f is withdrawn in register with and parallel to the container peripheral wall 18.

The crank 42f is mounted to the pivot 214 adjacent the mounting recess 224. In some embodiments, in the crank mounted position, the end of the crank coupling portion 218 is received between the two L-shaped members of the crank mounting bracket 210 and between the pivot 214 and the crank engaging portion distal part 204.

In some embodiments, a bracket 225 defining a recess 226 extends from the crank assembly 34f and the recess 226 may receive the crank intermediate portion 222 in the crank stowed position, as seen in FIG. 27C.

In operation, starting from the crank mounted configuration, one may use the crank 42f to rotate the crank assembly shaft 35f. The biasing element 212 ensures that the crank 42f remains in the crank mounted position as the collar 208 is maintained in the collar proximalmost position, which corresponds to a position in which the crank coupling portion 218 is fully engaged on the crank receiving portion distal part 204. In the crank mounted configuration, the crank mount 206 is in the crank mount proximal position, the crank 42f is in the crank extended position, and mechanical interference between the crank coupling portion 218 and the crank assembly shaft 35f prevents pivotal movements of the crank 42f towards the crank retracted position.

To store the crank, one first pulls on the crank 42f in a distal direction, which moves the collar 208 towards the collar distalmost position. This withdraws the crank coupling portion 218 from the crank receiving portion distal part 204. If required, the crank may also be rotated so as to be pivotable substantially vertically. Once the the crank coupling portion 218 is withdrawn from the crank receiving portion distal part 204, the crank 42f may be pivoted about the pivot 214, as seen in FIGS. 27B and 28B. The crank is then in a crank transition configuration in which the crank mount 206 is in the crank mount distal position, and the crank 42f is freely pivotable between the crank extended and retracted positions. The tension on the crank 42f may then be released, which allows the collar 208 to return to the collar proximalmost position, and the crank 42f may be rotated to the crank retracted position until it is received in the recess 226 of the bracket 225. This achieves the crank stowed configuration. To reinstall the crank 42f on the crank assembly shaft 35f in the mounted position, these steps are reversed.

It should be noted that while the crank 42f and its pivotable operation has been described in the context of a specific rod-actuated tarpaulin manipulating systems, the crank 42f and associated structure are also usable with any other suitable tarpaulin manipulators engaging the tarpaulin 12 and operable between a retracting mode and an extending mode. In the retracting mode, the tarpaulin manipulator is operable for moving the tarpaulin second end 30 towards the aperture first end 24 while withdrawing the tarpaulin 12 from the container top aperture 20 to move the tarpaulin 12 to the tarpaulin retracted configuration. In the extending mode, the tarpaulin manipulator is operable for moving the tarpaulin second end 30 towards the aperture second end 26 while extending the tarpaulin across the container top aperture 20 to move the tarpaulin to the tarpaulin extended configuration. The rod 32 is an example of a tarpaulin manipulators. Other tarpaulin manipulators include sliders to which the tarpaulin is mounted so that the tarpaulin is retracted and extended through a movement of the sliders along the top aperture 20. A non-limiting example of such a system is described U.S. Pat. No. 8,864,212 issued Oct. 21, 2014 to Cramaro, the contents of which is hereby incorporated by reference in its entirety. The crank 42f and associated systems are also usable in other suitable crank-actuated container covering systems. When such alternative tarpaulin manipulators are used, the transmission assembly 36b is operatively coupled to the crank assembly shaft 35f and to the tarpaulin manipulator for transmitting rotations of the crank assembly shaft 35f to the tarpaulin manipulator so that rotation of the crank assembly shaft 35f about the crank shaft rotation axis 228 causes the tarpaulin manipulator to operate in either the extending or the retracting modes. Thus, with the crank 42f in the crank mounted configuration, rotating the crank 42f in a first direction about the crank shaft rotation axis 228 operates the tarpaulin manipulator in the retracting mode and rotating the crank 42f in a second direction opposite the first direction about the crank shaft rotation axis 228 operates the tarpaulin manipulator in the extending mode. The transmission assembly of such alternative tarpaulin manipulators may include any suitable components, such as shafts, gears and chains, allowing operation of the tarpaulin manipulator through rotation of the crank 42f.

With reference to FIG. 27A, the ratchet type mechanism 27f includes a gear 230 mounted to the crank assembly shaft 35f and jointly rotatable therewith and a pawl 232 mounted adjacent the gear 230 and positionable so as to engage the gear to prevent rotation thereof in a predetermined direction. The pawl 232 for example defines two hooks 234 opposed to each other that can alternatively engage the gear 230. The pawl 232 is mounted to a pawl pivot 236 secured to a crank shaft mounting bracket 238 to which the crank assembly shaft 35f is rotatably mounted, above and vertically aligned the crank assembly shaft 35f. The pawl 232 is longer than a distance between the pawl pivot 236 and the crank assembly shaft 35f. Thus, the pawl 232 can abut against the gear 230 in two different positions. In each of the positions, one of the hooks 234 engages the gear 230 so that rotating the gear 230 in one direction is possible as the hook 234 can be lifted by the teeth 231 of the gear 230. In the other direction, rotation is prevented as the hook 234 engages one tooth 231 and transmits forces exerted thereonto generally towards the pawl pivot 236, or towards a point between the pawl pivot 236 and the crank assembly shaft 235. This would create a rotation of the pawl 232 so that the tooth 231 goes down, which is prevented by the presence of the gear. Typically, the pawl 232 is alternatively positionable in a pawl clockwise blocking position and a pawl counterclockwise blocking position wherein the pawl 232 respectively blocks clockwise and counterclockwise rotations of the gear 230 when viewed from the crank distal end while allowing respectively counterclockwise and clockwise rotations of the gear when viewed from the crank distal end.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A device for handling a tarpaulin to cover at least part of a container using the tarpaulin, the container defining a container bottom wall, a container peripheral wall extending therefrom and a container top aperture delimited by a container top edge of the container peripheral wall substantially opposed to the container bottom wall, the container top aperture defining an aperture first end and a substantially opposed aperture second end, the tarpaulin defining a tarpaulin first end and a substantially opposed tarpaulin second end, the tarpaulin being secured to the container at the tarpaulin first end substantially opposed to the aperture second end and movable between tarpaulin retracted and extended configurations in which the tarpaulin is respectively substantially retracted from the container top aperture and extended across the container top aperture, the device comprising:

a tarpaulin manipulator for engaging the tarpaulin to be operable between a retracting mode and an extending mode, wherein, in the retracting mode, the tarpaulin manipulator is operable for moving the tarpaulin second end towards the aperture first end while withdrawing the tarpaulin from the container top aperture to move the tarpaulin to the tarpaulin retracted configuration, and, in the extending mode, the tarpaulin manipulator is operable for moving the tarpaulin second end towards the aperture second end while extending the tarpaulin across the container top aperture to move the tarpaulin to the tarpaulin extended configuration;

an actuator assembly, the actuator assembly including a crank and a crank assembly shaft defining a substantially longitudinal crank shaft rotation axis, the crank assembly shaft defining a crank assembly shaft distal end, the crank including a crank coupling portion, the crank being movable relative to the crank assembly shaft between crank mounted and stowed configurations with the crank and crank assembly shaft remaining mechanically coupled to each other; and a transmission assembly between the crank assembly shaft and the tarpaulin manipulator, the transmission assembly being operatively coupled to the crank assembly shaft and to the tarpaulin manipulator for transmitting rotations of the crank assembly shaft to the tarpaulin manipulator so that rotation of the crank assembly shaft about the crank shaft rotation axis causes the tarpaulin manipulator to operate in either the extending or the retracting modes;

wherein, in the crank mounted configuration, the crank coupling portion and the crank assembly shaft are engaged to each other at the crank assembly shaft distal end so that the crank and crank assembly shaft are jointly rotatable about the crank shaft rotation axis with the crank protruding longitudinally from the crank assembly shaft, and, in the crank stowed configuration, the crank coupling portion is disengaged from the crank distal end and the crank is pivoted to be radially in register with the crank assembly shaft; and wherein, with the crank in the crank mounted configuration, rotating the crank in a first direction about the crank shaft rotation axis operates the tarpaulin manipulator in the retracting mode and rotating the crank in a second direction opposite the first direction about the crank shaft rotation axis operates the tarpaulin manipulator in the extending mode.

2. The device as defined in claim 1, wherein the crank coupling portion defines a mounting recess configured to removably longitudinally receive the crank assembly shaft at the crank assembly shaft distal end.

3. The device as defined in claim 2, wherein the crank and the mounting recess each have a transversal cross-sectional configuration lacking continuous rotational symmetry.

4. The device as defined in claim 2, wherein the crank and the mounting recess each have a polygonal transversal cross-sectional configuration.

5. The device as defined in claim 2, further comprising a crank mount, the crank mount being movable longitudinally along the crank assembly shaft between crank mount proximal and distal positions, the crank being pivotally mounted to the crank mount so as to be pivotable about a pivot axis perpendicular and laterally offset relative to the crank shaft rotation axis between crank extended and retracted positions wherein:
- in the crank mounted configuration, the crank mount is in the crank mount proximal position, the crank is in the crank extended position, and mechanical interference between the crank coupling portion and the crank assembly shaft prevents pivotal movements of the crank towards the crank retracted position;
- in the crank stowed configuration, the crank mount is in the crank mount proximal position and the crank is pivoted in the crank retracted position; and
- the crank is movable to a crank transition configuration in which the crank mount is in the crank mount distal position, and the crank is freely pivotable between the crank extended and retracted positions.

6. The device as defined in claim 5, further comprising a biasing element biasing the crank mount towards the crank mount proximal position.

7. The device as defined in claim 5, wherein the crank mount includes a collar mounted to the crank assembly shaft so as to be longitudinally movable therealong.

8. The device as defined in claim 1, wherein the crank further includes a handle substantially parallel and offset relative to the crank shaft rotation axis when the crank is in the crank mounted configuration.

9. The device as defined in claim 1, further comprising a gear mounted to the crank assembly shaft and jointly rotatable therewith and a pawl mounted adjacent the gear and positionable so as to engage the gear to prevent rotation thereof in a predetermined direction.

10. The device as defined in claim 9, wherein the pawl is alternatively positionable in a pawl clockwise blocking position and a pawl counterclockwise blocking position wherein the pawl respectively blocks clockwise and counterclockwise rotations of the gear when viewed from the crank distal end while allowing respectively counterclockwise and clockwise rotations of the gear when viewed from the crank distal end.

11. The device as defined in claim 10, further comprising a crank shaft mounting bracket securable to the container, the crank assembly shaft being mounted to the crank shaft mounting bracket and axially rotatable relative thereto, the pawl being pivotally mounted to the crank shaft mounting bracket at a pivot provided above and vertically aligned with the crank assembly shaft when the crank assembly shaft is operatively mounted to the container so as to be movable between the pawl clockwise and counterclockwise blocking positions.

12. The device as defined in claim 1, further comprising a crank shaft mounting bracket securable to the container, the crank assembly shaft being mounted to the crank shaft mounting bracket and axially rotatable relative thereto, a handle securing bracket extending from the crank shaft mounting bracket and defining a recess receiving part of the crank in the crank stowed configuration to secure the crank in the crank stowed configuration.

13. The device as defined in claim 1, wherein the device is mountable to the container so that the crank assembly shaft distal end is adjacent the container peripheral wall and so that the crank protrudes from the container peripheral wall in prolongation of the crank assembly shaft in the crank mounted configuration and the crank is vertically above the crank assembly shaft and withdrawn in register with and parallel to the container peripheral wall in the crank stowed configuration.

14. The device as defined in claim 1, wherein
- the tarpaulin manipulator includes a rod defining a rod longitudinal axis, the rod being movable between rod first and second positions wherein the rod is respectively substantially adjacent the aperture first and second ends, the tarpaulin being mounted to the rod at the tarpaulin second end to allow rolling of the tarpaulin thereonto and unrolling of the tarpaulin therefrom when the rod is rotated about the rod longitudinal axis;
- the transmission assembly is operatively coupled to the crank assembly shaft and to the rod for transmitting rotations of the crank assembly shaft to the rod so that rotation of the crank assembly shaft about the crank shaft rotation axis causes rotation of the rod about the rod longitudinal axis;
- with the crank in the crank mounted configuration, rotating the crank in a first direction about the crank shaft rotation axis operates the tarpaulin manipulator in the retracting mode by rolling the tarpaulin around the rod and moving the rod towards the rod first position to move the tarpaulin to the tarpaulin retracted configuration and rotating the crank in a second direction opposite the first direction about the crank shaft rotation axis operates the tarpaulin manipulator in the extending mode by unrolling the tarpaulin from the rod and moving the rod towards the rod second position to move the tarpaulin to the tarpaulin extended configuration.

15. A covered vehicle container comprising:
- a container defining a container bottom wall, a container peripheral wall extending therefrom and a container top aperture delimited by a container top edge of the container peripheral wall substantially opposed to the container bottom wall, the container top aperture defining an aperture first end and a substantially opposed aperture second end;
- a tarpaulin defining a tarpaulin first end and a substantially opposed tarpaulin second end, the tarpaulin being secured to the container at the tarpaulin first end substantially opposed to the aperture second end and movable between tarpaulin retracted and extended configurations in which the tarpaulin is respectively substantially retracted from the container top aperture and extended across the container top aperture; and
- a device for handling the tarpaulin including:
  - a tarpaulin manipulator engaging the tarpaulin and operable between a retracting mode and an extending mode, wherein, in the retracting mode, the tarpaulin manipulator is operable for moving the tarpaulin second end towards the aperture first end while withdrawing the tarpaulin from the container top aperture to move the tarpaulin to the tarpaulin retracted configuration, and, in the extending mode, the tarpaulin manipulator is operable for moving the tarpaulin second end towards the aperture second end while extending the tarpaulin across the container top aperture to move the tarpaulin to the tarpaulin extended configuration;
  - an actuator assembly mounted to the container, the actuator assembly including a crank and a crank assembly shaft defining a substantially longitudinal crank shaft rotation axis, the crank assembly shaft defining a crank assembly shaft distal end, the crank including a crank coupling portion, the crank being movable relative to the crank assembly shaft between crank mounted and stowed configurations with the crank and crank assembly shaft remaining mechanically coupled to each other; and a transmission assembly between the crank assembly shaft and the tarpaulin manipulator, the transmission assembly being operatively coupled to the crank assembly shaft and to the tarpaulin manipulator for transmitting rotations of the crank assembly shaft to the tarpaulin manipulator so that rotation of the crank assembly shaft about the crank shaft rotation axis causes the tarpaulin manipulator to operate in either the extending or the retracting modes;

wherein, in the crank mounted configuration, the crank coupling portion and the crank assembly shaft are engaged to each other at the crank assembly shaft distal end so that the crank and crank assembly shaft are jointly rotatable about the crank shaft rotation axis with the crank protruding longitudinally from the crank assembly shaft, and, in the crank stowed configuration, the crank coupling portion is disengaged from the crank distal end and the crank is pivoted to be radially in register with the crank assembly shaft; and wherein, with the crank in the crank mounted configuration, rotating the crank in a first direction about the crank shaft rotation axis operates the tarpaulin manipulator in the retracting mode and rotating the crank in a second direction opposite the first direction about the crank shaft rotation axis operates the tarpaulin manipulator in the extending mode.

16. The covered vehicle container as defined in claim 15, wherein the crank coupling portion defines a mounting recess configured to removably longitudinally receive the crank assembly shaft at the crank assembly shaft distal end.

17. The covered vehicle container as defined in claim 16, wherein the crank and the mounting recess each have a transversal cross-sectional configuration lacking continuous rotational symmetry.

18. The covered vehicle container as defined in claim 16, further comprising a crank mount, the crank mount being movable longitudinally along the crank assembly shaft between crank mount proximal and distal positions, the crank being pivotally mounted to the crank mount so as to be pivotable about a pivot axis perpendicular and laterally offset relative to the crank shaft rotation axis between crank extended and retracted positions wherein:

in the crank mounted configuration, the crank mount is in the crank mount proximal position, the crank is in the crank extended position, and mechanical interference between the crank coupling portion and the crank assembly shaft prevents pivotal movements of the crank towards the crank retracted position;

in the crank stowed configuration, the crank mount is in the crank mount proximal position and the crank is pivoted in the crank retracted position; and the crank is movable to a crank transition configuration in which the crank mount is in the crank mount distal position, and the crank is freely pivotable between the crank extended and retracted positions.

19. The covered vehicle container as defined in claim 18, further comprising a biasing element biasing the crank mount towards the crank mount proximal position.

20. The device as defined in claim 15, wherein the crank further includes a handle substantially parallel and offset relative to the crank shaft rotation axis when the crank is in the crank mounted configuration.

21. The covered vehicle container as defined in claim 15, further comprising a gear mounted to the crank assembly shaft and jointly rotatable therewith and a pawl mounted adjacent the gear and positionable so as to engage the gear to prevent rotation thereof in a predetermined direction.

22. The covered vehicle container as defined in claim 21, wherein the pawl is alternatively positionable in a pawl clockwise blocking position and a pawl counterclockwise blocking position wherein the pawl respectively blocks clockwise and counterclockwise rotations of the gear when viewed from the crank distal end while allowing respectively counterclockwise and clockwise rotations of the gear when viewed from the crank distal end.

23. The covered vehicle container as defined in claim 15, wherein the crank assembly shaft distal end is adjacent the container peripheral wall;

the crank protrudes from the container peripheral wall in prolongation of the crank assembly shaft in the crank mounted configuration; and the crank is vertically above the crank assembly shaft and withdrawn in register with and parallel to the container peripheral wall in the crank stowed configuration.

24. The covered vehicle container as defined in claim 15, wherein the tarpaulin manipulator includes a rod defining a rod longitudinal axis, the rod being movable between rod first and second positions wherein the rod is respectively substantially adjacent the aperture first and second ends, the tarpaulin being mounted to the rod at the tarpaulin second end to allow rolling of the tarpaulin thereonto and unrolling of the tarpaulin therefrom when the rod is rotated about the rod longitudinal axis;

the transmission assembly is operatively coupled to the crank assembly shaft and to the rod for transmitting rotations of the crank assembly shaft to the rod so that rotation of the crank assembly shaft about the crank assembly shaft rotation axis causes rotation of the rod about the rod longitudinal axis;

with the crank in the crank mounted configuration, rotating the crank in a first direction about the crank shaft rotation axis operates the tarpaulin manipulator in the retracting mode by rolling the tarpaulin around the rod and moving the rod towards the rod first position to move the tarpaulin to the tarpaulin retracted configuration and rotating the crank in a second direction opposite the first direction about the crank shaft rotation axis operates the tarpaulin manipulator in the extending mode by unrolling the tarpaulin from the rod and moving the rod towards the rod second position to move the tarpaulin to the tarpaulin extended configuration.

25. The covered vehicle container as defined in claim 15, further comprising a crank shaft mounting bracket secured to the container, the crank assembly shaft being mounted to the crank shaft mounting bracket and axially rotatable relative thereto, a handle securing bracket extending from the crank shaft mounting bracket and defining a recess receiving part of the crank in the crank stowed configuration to secure the crank in the crank stowed configuration.

\* \* \* \* \*